US008619027B2

(12) United States Patent
Hill et al.

(10) Patent No.: US 8,619,027 B2
(45) Date of Patent: Dec. 31, 2013

(54) INTERACTIVE INPUT SYSTEM AND TOOL TRAY THEREFOR

(75) Inventors: Doug Hill, Calgary (CA); Michael Rounding, Calgary (CA); Michael Trenholm-Boyle, Calgary (CA); Edward Tse, Calgary (CA)

(73) Assignee: SMART Technologies ULC (CA)

( * ) Notice: Subject to any disclaimer, the term of this patent is extended or adjusted under 35 U.S.C. 154(b) by 323 days.

(21) Appl. No.: 13/027,717

(22) Filed: Feb. 15, 2011

(65) Prior Publication Data

US 2012/0206344 A1 Aug. 16, 2012

(51) Int. Cl.
*G09G 5/08* (2006.01)

(52) U.S. Cl.
USPC ............... 345/157; 345/156; 345/173

(58) Field of Classification Search
USPC ................ 345/156–184; 178/18.01–19.05
See application file for complete search history.

(56) References Cited

U.S. PATENT DOCUMENTS

| 5,448,263 | A |   | 9/1995 | Martin |
|---|---|---|---|---|
| 5,778,404 | A | * | 7/1998 | Capps et al. ............... 715/234 |
| 6,141,000 | A |   | 10/2000 | Martin |
| 6,337,681 | B1 |   | 1/2002 | Martin |
| 6,747,636 | B2 |   | 6/2004 | Martin |
| 6,803,906 | B1 |   | 10/2004 | Morrison et al. |
| 7,232,986 | B2 |   | 6/2007 | Worthington et al. |
| 7,236,162 | B2 |   | 6/2007 | Morrison et al. |
| 7,274,356 | B2 |   | 9/2007 | Ung et al. |
| 7,532,206 | B2 |   | 5/2009 | Morrison et al. |
| 2002/0002629 | A1 |   | 1/2002 | Fukushima |
| 2002/0103616 | A1 | * | 8/2002 | Park et al. ................ 702/150 |
| 2003/0006892 | A1 | * | 1/2003 | Church ..................... 340/439 |
| 2008/0111798 | A1 | * | 5/2008 | Oveisi ...................... 345/179 |
| 2009/0277694 | A1 | * | 11/2009 | Hansen et al. ............ 178/18.03 |
| 2009/0278794 | A1 |   | 11/2009 | McReynolds et al. |
| 2010/0261466 | A1 |   | 10/2010 | Chang et al. |
| 2010/0275132 | A1 |   | 10/2010 | Hildebrandt et al. |
| 2011/0007037 | A1 | * | 1/2011 | Ogawa ..................... 345/179 |
| 2011/0151973 | A1 | * | 6/2011 | Solomon et al. ............. 463/31 |
| 2011/0169727 | A1 |   | 7/2011 | Akitt |
| 2011/0169736 | A1 |   | 7/2011 | Bolt et al. |
| 2011/0170253 | A1 |   | 7/2011 | Liu et al. |

FOREIGN PATENT DOCUMENTS

| WO | 2004109496 A2 | 12/2004 |
|---|---|---|
| WO | 2011/085479 A1 | 7/2011 |

OTHER PUBLICATIONS

Transmittal; International Search Report; and Written Opinion of the International searching Authority for International Searching Authority for International Application No. PCT/CA2012/000121 with a mailing date of May 4, 2012.

* cited by examiner

*Primary Examiner* — Amare Mengistu
*Assistant Examiner* — Premal Patel
(74) *Attorney, Agent, or Firm* — Katten Muchin Rosenman LLP

(57) ABSTRACT

A tool tray for an interactive input system comprises a housing having an upper surface defining at least one receptacle sized to receive a tool for interacting with an interactive surface, a sensor configured to detect the presence of the tool within the receptacle and at least one display in communication with the sensor. The display is configured to present a pointer attribute selection screen upon removal of the tool from the receptacle.

41 Claims, 16 Drawing Sheets

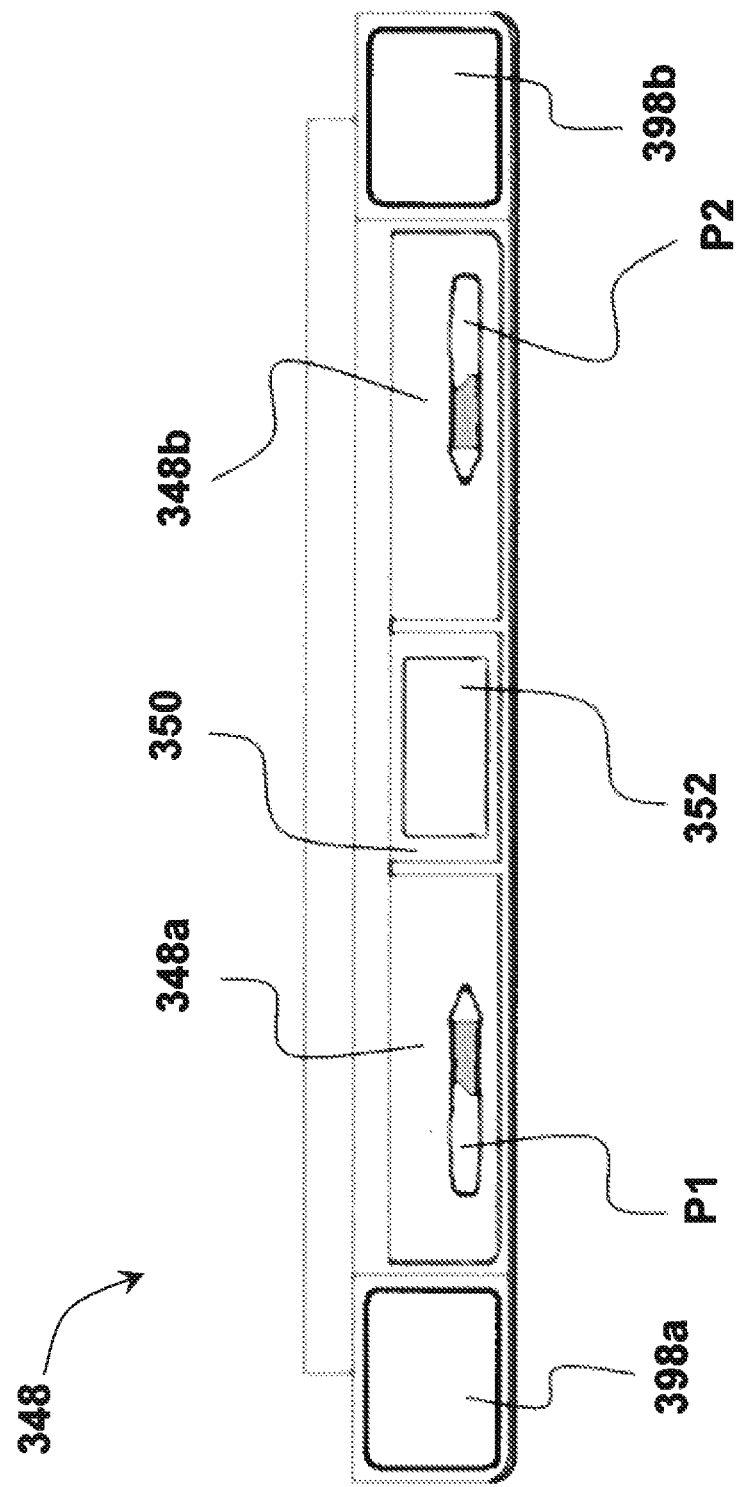

INTERACTIVE INPUT SYSTEM AND TOOL TRAY THEREFOR

CROSS-REFERENCE TO RELATED APPLICATIONS

This application relates to U.S. Provisional Application No. 61/294,831 to Bolt et al. filed on Jan. 13, 2010, entitled "INTERACTIVE INPUT SYSTEM AND TOOL TRAY THEREFOR", and also relates to U.S. patent application Ser. No. 12/709,424 to Bolt et al. filed on Feb. 19, 2010, entitled "INTERACTIVE INPUT SYSTEM AND TOOL TRAY THEREFOR", the contents of which are incorporated herein by reference in their entirety.

FIELD OF THE INVENTION

The present invention relates generally to interactive input systems, and in particular, to an interactive input system and a tool tray therefor.

BACKGROUND OF THE INVENTION

Interactive input systems that allow users to inject input (e.g. digital ink, mouse events, etc.) into an application program using an active pointer (e.g. a pointer that emits light, sound or other signal), a passive pointer (e.g. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206, all assigned to SMART Technologies ULC of Calgary, Alberta, Canada, assignee of the subject application, the contents of which are incorporated herein by reference in their entirety; touch systems comprising touch panels employing electromagnetic, capacitive, acoustic or other technologies to register pointer input; tablet personal computers (PCs); laptop PCs; personal digital assistants (PDAs); and other handheld devices and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital imaging devices at its corners. The digital imaging devices have overlapping fields of view that encompass and look generally across the touch surface. The digital imaging devices acquire images looking across the touch surface from different vantages and generate image data. Image data acquired by the digital imaging devices is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

U.S. Pat. No. 7,532,206 to Morrison et al. discloses a touch system and method that differentiates between passive pointers used to contact a touch surface so that pointer position data generated in response to a pointer contact with the touch surface can be processed in accordance with the type of pointer used to contact the touch surface. The touch system comprises a touch surface to be contacted by a passive pointer and at least one imaging device having a field of view looking generally across the touch surface. At least one processor communicates with the at least one imaging device and analyzes images acquired by the at least one imaging device to determine the type of pointer used to contact the touch surface and the location on the touch surface where pointer contact is made. The determined type of pointer and the location on the touch surface where the pointer contact is made are used by a computer to control execution of an application program executed by the computer.

In order to determine the type of pointer used to contact the touch surface, a curve of growth method is employed to differentiate between different pointers. During this method, a horizontal intensity profile (HIP) is formed by calculating a sum along each row of pixels in each acquired image thereby to produce a one-dimensional profile having a number of points equal to the row dimension of the acquired image. A curve of growth is then generated from the HIP by forming the cumulative sum from the HIP.

Many models of interactive boards sold by SMART Technologies ULC under the name SMART Board™ that employ machine vision technology to register pointer input have a tool tray mounted below the interactive board. The tool tray comprises slots or receptacles for holding pen tools and an eraser tool that can be used to interact with the touch surface of the interaction board. When a pen tool is removed from its receptacle in the tool tray, a sensor in the tool tray detects the removal of that pen tool allowing the interactive board to determine the particular pen tool that has been selected. Subsequently, when a pointer is used to contact the touch surface of the interactive board, software treats the pointer contact with the touch surface as digital ink input in the colour assigned to the selected pen tool, regardless of whether the contact is made using the selected pen tool, or another pointer such as a finger or other object. Similarly, when the eraser tool is removed from its receptacle in the tool tray, the software treats pointer contact with the touch surface as an erasing action, regardless of whether the contact is made using the selected eraser tool, or another pointer such as a finger or other object. Additionally, below the tool tray two buttons are provided. One of the buttons, when pressed, allows the user to use a pointer to execute typical "right click" mouse functions, such as copy, cut, paste, select all, and the like, while the other button, when pressed, displays an onscreen keyboard that allow users to use a pointer to interact with the keyboard to enter text, numbers, and the like. Although such existing tool trays are adequate, improvements are desired.

It is therefore an object of the present invention at least to provide a novel interactive input system and a tool tray therefor.

SUMMARY OF THE INVENTION

Accordingly, in one aspect there is provided a tool tray for an interactive input system comprising a housing having an upper surface defining at least one receptacle sized to receive a tool for interacting with an interactive surface; a sensor configured to detect the presence of the tool within the receptacle; and at least one display in communication with the sensor, the display being configured to present a pointer attribute selection screen upon removal of the tool from the receptacle.

In one embodiment, the pointer attributes selection screen is a pointer colour selection, size selection and/or shape selection screen. The display may be configured to receive touch input. In this case, the pointer attribute selection screen comprises at least one virtual button associated with an attribute of pointer input. Selection of the virtual button assigns a pointer attribute to subsequent pointer interaction with the interactive surface.

The display may be configured to display at least one additional screen. The at least one additional screen may comprise a pointer attribute screen that comprises at least one virtual button selectable for assigning a pointer attribute to subsequent pointer interaction with the interactive surface. The at least one additional screen may be an eraser attribute screen comprising at least one virtual button selectable for assigning an eraser attribute to subsequent pointer interaction with the interactive surface. The at least one additional screen may be an insert object screen comprising at least one virtual button selectable for assigning an object insertion attribute to subsequent pointer interaction with the interactive surface.

In one embodiment, the upper surface of the housing may define a plurality of receptacles sized to receive tools for interacting with the interacting surface. At least one of the receptacles may be configured to receive a pen tool and at least one of the receptacles may be configured to receive an eraser tool. The display may be positioned between receptacles and generally centrally positioned along the housing. In another embodiment, the tool tray may comprise a plurality of displays.

According to another aspect there is provided an interactive input system comprising an interactive surface; and a tool tray adjacent the interactive surface comprising a housing configured to accommodate at least one tool for interacting with the interactive surface; a sensor configured to detect the presence of the tool when accommodated by the housing; and at least one display on the housing, the display being configured to present at least one selectable attribute upon removal of the tool from the housing.

According to yet another aspect there is provided an interactive input system comprising an interactive surface on which an image is presented; and at least one display panel adjacent said interactive surface on which an image is presented, said interactive surface and display panel being individually responsive to input events.

In one embodiment, the image presented on the interactive surface is a computer desktop and the image presented on the display comprises at least one selectable attribute. The at least one selectable attribute may comprise at least one of pointer colour, pointer size and pointer shape. The display may be configured to receive touch input and present at least one virtual button that is selectable to assign a pointer attribute to pointer input made on the interactive surface. The interactive input system may further comprise a tool tray that is mounted on the interactive surface, the tool tray supporting the display panel and accommodating tools for interacting with the interactive surface. Default selectable attributes are presented on the display panel upon removal of a tool from the tool tray.

BRIEF DESCRIPTION OF THE DRAWINGS

Embodiments will now be described more fully with reference to the accompanying drawings in which:

FIG. 10 is a plan view of another embodiment of a tool tray forming part of the interactive input system of FIG. 1;

DETAILED DESCRIPTION OF THE EMBODIMENTS

In the following description, a tool tray for an interactive input system and an interactive input system incorporating the same are discussed. The tool tray has a housing with an upper surface defining at least one receptacle sized to receive a tool for interacting with an interactive surface. A sensor is configured to detect the presence of the tool within the receptacle. At least one display is in communication with the sensor. The display is configured to present a pointer attribute selection screen upon removal of the tool from the receptacle. Further specifics of the tool tray and interactive input system will now be described with particular reference to FIGS. 1 to 13.

Figure 1:
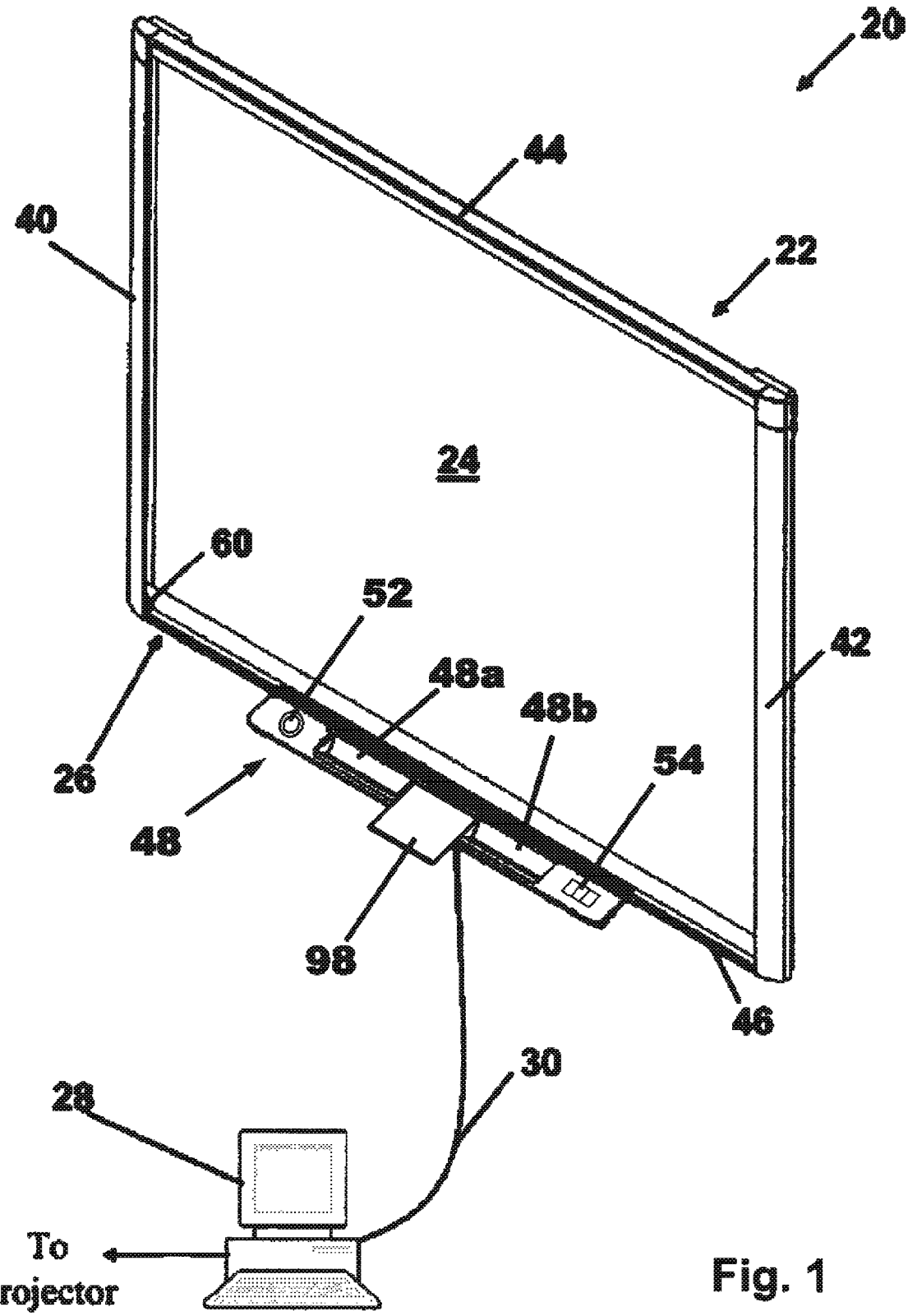
FIG. 1 is a schematic, partial perspective view of an interactive input system.
Figure 2:
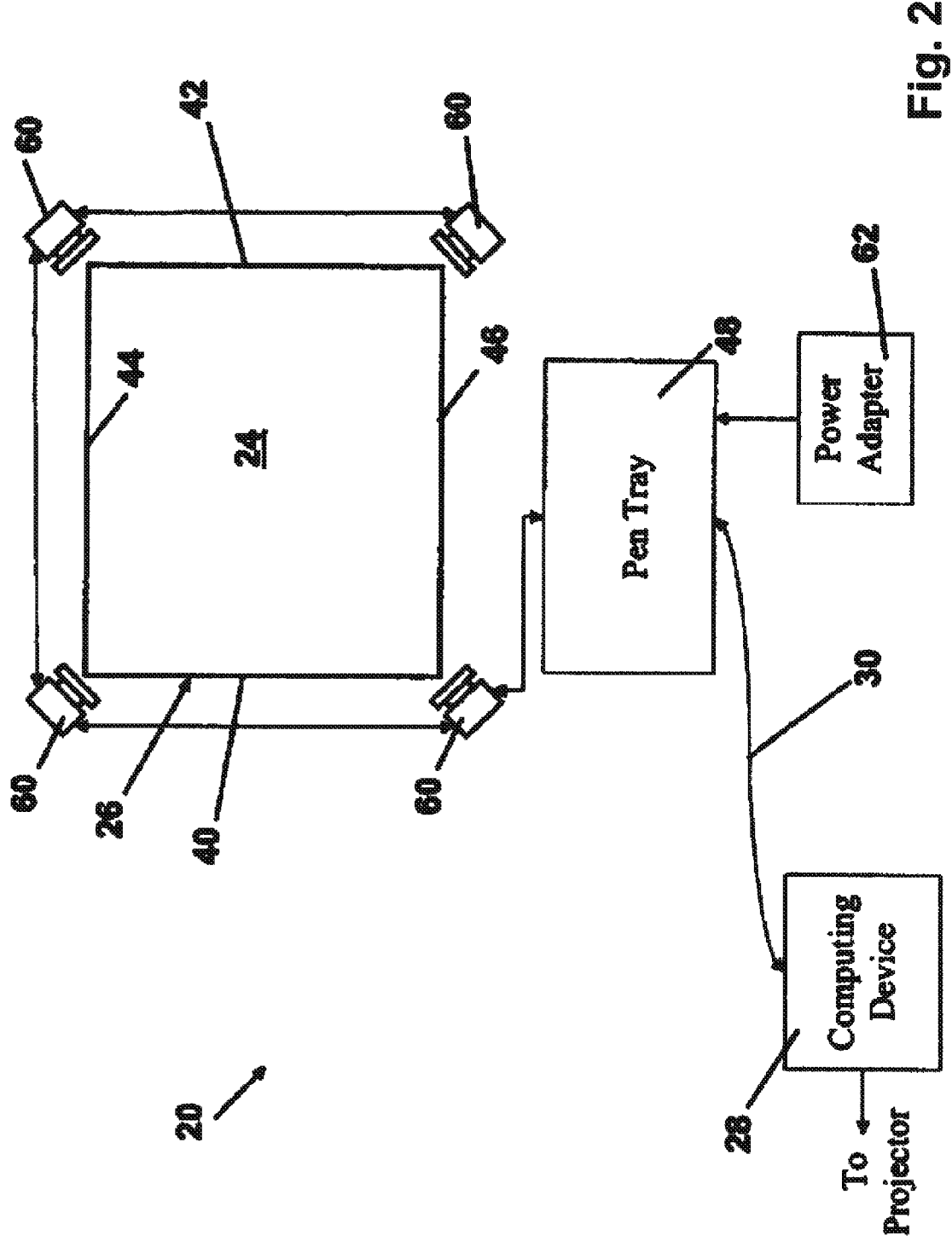
FIG. 2 is a block diagram of the interactive input system of FIG. 1.

Turning now to FIGS. 1 and 2, an interactive input system that allows a user to inject input such as digital ink, mouse events etc. into an application program executed by a computing device is shown and is generally identified by reference numeral 20. In this embodiment, interactive input system 20 comprises an interactive board 22 mounted on a vertical support surface such as for example, a wall surface or the like. Interactive board 22 comprises a generally planar, rectangular interactive surface 24 that is surrounded about its periphery by a bezel 26. An ultra-short throw projector (not shown) such as that sold by SMART Technologies ULC under the name SMART UX60 is also mounted on the support surface above the interactive board 22 and projects an image, such as for example a computer desktop, onto the interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30 or other suitable wired or wireless connection. General purpose computing device 28 processes the output of the interactive board 22 and adjusts image data that is output to the projector, if required, so that the image presented on the interactive surface 24 reflects pointer activity. In this manner, the interactive board 22, general purpose computing device 28 and projector allow pointer activity proximate to the interactive surface 24 to be recorded as writing or drawing or used to control execution of one or more application programs executed by the general purpose computing device 28.

The bezel 26 in this embodiment is mechanically fastened to the interactive surface 24 and comprises four bezel segments 40, 42, 44, 46. Bezel segments 40 and 42 extend along opposite side edges of the interactive surface 24 while bezel segments 44 and 46 extend along the top and bottom edges of the interactive surface 24 respectively. In this embodiment, the inwardly facing surface of each bezel segment 40, 42, 44 and 46 comprises a single, longitudinally extending strip or band of retro-reflective material. To take best advantage of the properties of the retro-reflective material, the bezel segments 40, 42, 44 and 46 are oriented so that their inwardly facing surfaces extend in a plane generally normal to the plane of the interactive surface 24.

A tool tray 48 is affixed to the interactive board 22 adjacent the bezel segment 46 using suitable fasteners such as for example, screws, clips, adhesive etc. The tool tray 48 comprises a housing that accommodates a master controller 50 and that has an upper surface configured to define a plurality of receptacles or slots. In this embodiment, the upper surface of the housing is configured to define two laterally spaced receptacles 48a and 48b that are sized to receive pen tools P which can be used to interact with the interactive surface 24.

A main power button 52 is provided adjacent one end of the housing and is user actuable to control the on/off status of the interactive input system 20, together with any accessories connected the interactive input system 20, such as, for example, the projector (not shown). As can be seen, the power button 52 is generally positioned at an intuitive, easy-to-find location and therefore allows a user to switch the interactive input system 20 on and off in a facile manner. Control buttons 54 are provided adjacent the opposite end of the housing and are user actuable to enable a user to execute additional functions using the interactive input system 20. In this embodiment, these additional functions include launching an on-screen keyboard and initiating a calibration routine.

Imaging assemblies 60 are accommodated by the bezel 26, with each imaging assembly 60 being positioned adjacent a different corner of the bezel. The imaging assemblies 60 are oriented so that their fields of view overlap and look generally across the entire interactive surface 24. In this manner, any pointer such as for example a pen tool, an eraser tool, a user's finger, a cylinder or other suitable object, that is brought into proximity of the interactive surface 24 appears in the fields of view of the imaging assemblies 60. A power adapter 62 provides the necessary operating power to the interactive board 22 when connected to a conventional AC mains power supply.

Figure 3:
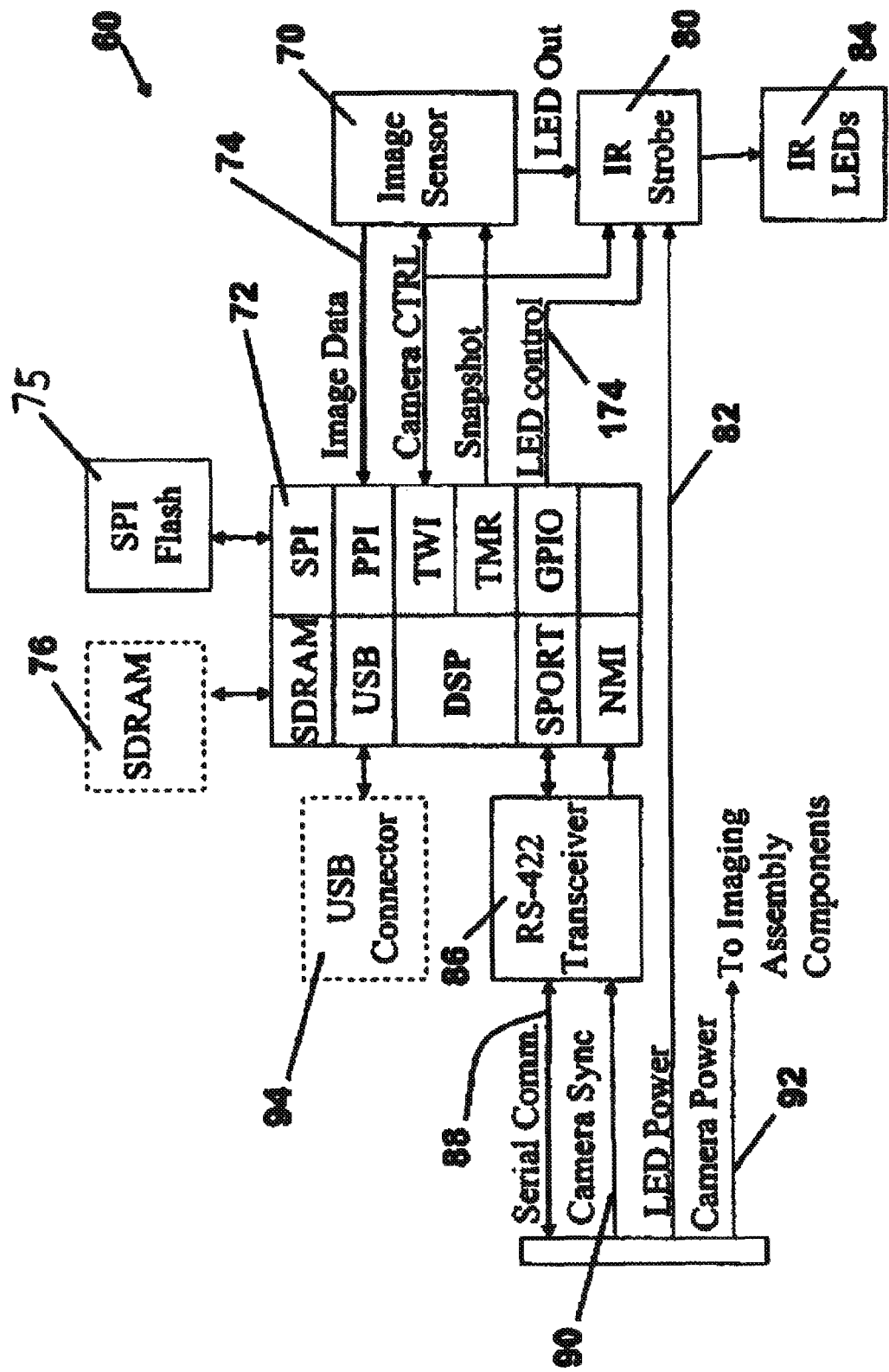
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an image sensor 70 such as that manufactured by Aptina (Micron) MT9V034 having an effective resolution of 752×98 pixels. The image sensor 70 is fitted with a two element, plastic lens (not shown) that provides the image sensor 70 with a field of view of approximately 104 degrees. In this manner, the other imaging assemblies 60 are within the field of view of the image sensor 70 thereby to ensure that the field of view of the image sensor 70 encompasses the entire interactive surface 24.

A digital signal processor (DSP) 72 such as that manufactured by Analog Devices under part number ADSP-BF522 Blackfin or other suitable processing device, communicates with the image sensor 70 over an image data bus 74 via a parallel port interface (PPI). A serial peripheral interface (SPI) flash memory 75 is connected to the DSP 72 via an SPI port and stores the firmware required for image assembly operation. Depending on the size of captured image frames as well as the processing requirements of the DSP 72, the imaging assembly 60 may optionally comprise synchronous dynamic random access memory (SDRAM) 76 to store additional temporary data as shown by the dotted lines. The image sensor 70 also communicates with the DSP 72 via a two-wire interface (TWI) and a timer (TMR) interface. The control registers of the image sensor 70 are written from the DSP 72 via the TWI in order to configure parameters of the image sensor 70 such as the integration period for the image sensor 70.

In this embodiment, the image sensor 70 operates in snapshot mode. In the snapshot mode, the image sensor 70, in response to an external trigger signal received from the DSP 72 via the TMR interface that has a duration set by a timer on the DSP 72, enters an integration period during which an image frame is captured. Following the integration period after the generation of the trigger signal by the DSP 72 has ended, the image sensor 70 enters a readout period during which time the captured image frame is available. With the image sensor in the readout period, the DSP 72 reads the image frame data acquired by the image sensor 70 over the image data bus 74 via the PPI. The frame rate of the image sensor 70 in this embodiment is between about 900 and about 960 frames per second. The DSP 72 in turn processes image frames received from the image sensor 72 and provides pointer information to a master controller 50 at a reduced rate of approximately 120 points/sec. Those of skill in the art will however appreciate that other frame rates may be employed depending on the desired accuracy of pointer tracking and whether multi-touch and/or active pointer identification is employed.

Three strobe circuits 80 communicate with the DSP 72 via the TWI and via a general purpose input/output (GPIQ) interface. The IR strobe circuits 80 also communicate with the image sensor 70 and receive power provided on LED power line 82 via the power adapter 62. Each strobe circuit 80 drives a respective illumination source in the form of an infrared (IR) light emitting diode (LED) 84. The IR LEDs 84 provide infrared backlighting over the interactive surface 24. Further specifics concerning the strobe circuits 80 and their operation are described in U.S. patent application Ser. No. 12/709,451 to Akitt entitled "INTERACTIVE INPUT SYSTEM AND ILLUMINATION SYSTEM THEREFOR" filed on Feb. 19, 2010, the content of which is incorporated herein by reference in its entirety.

The DSP 72 also communicates with an RS-422 transceiver 86 via a serial port (SPORT) and a non-maskable interrupt (NMI) port. The transceiver 86 communicates with the master controller 50 over a differential synchronous signal (DSS) communications link 88 and a synch line 90. Power for the components of the imaging assembly 60 is provided on power line 92 by the power adapter 62. DSP 72 may also optionally be connected to a USB connector 94 via a USB port as indicated by the dotted lines. The USB connector 94 can be used to connect the imaging assembly 60 to diagnostic equipment.

Figure 4A:
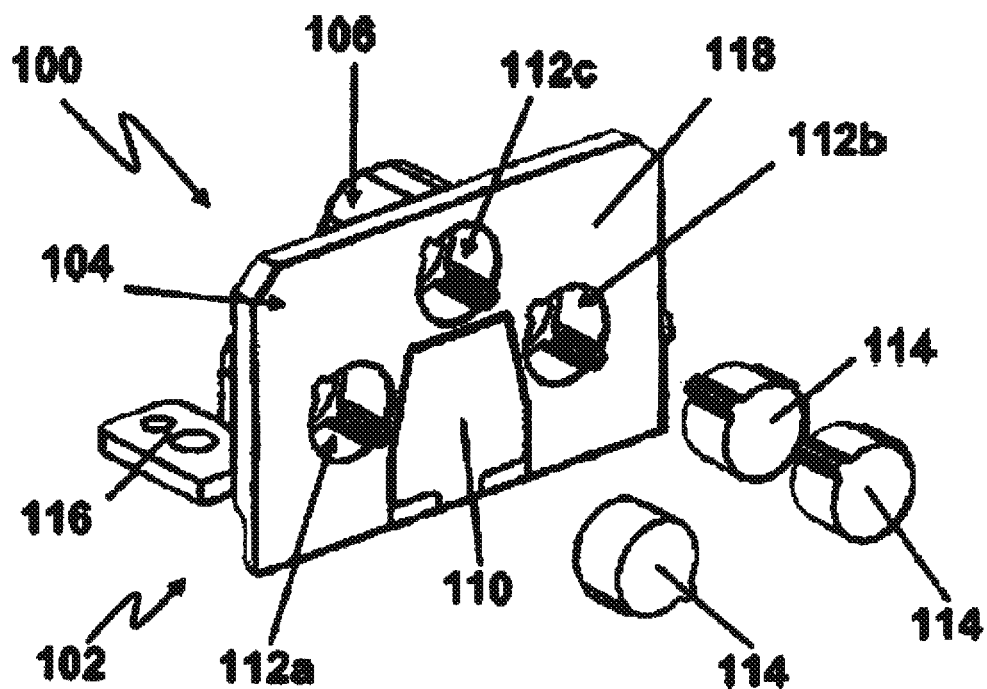
FIGS. 4a and 4b are front and rear perspective views of a housing assembly forming part of the imaging assembly of FIG. 3.
Figure 4B:
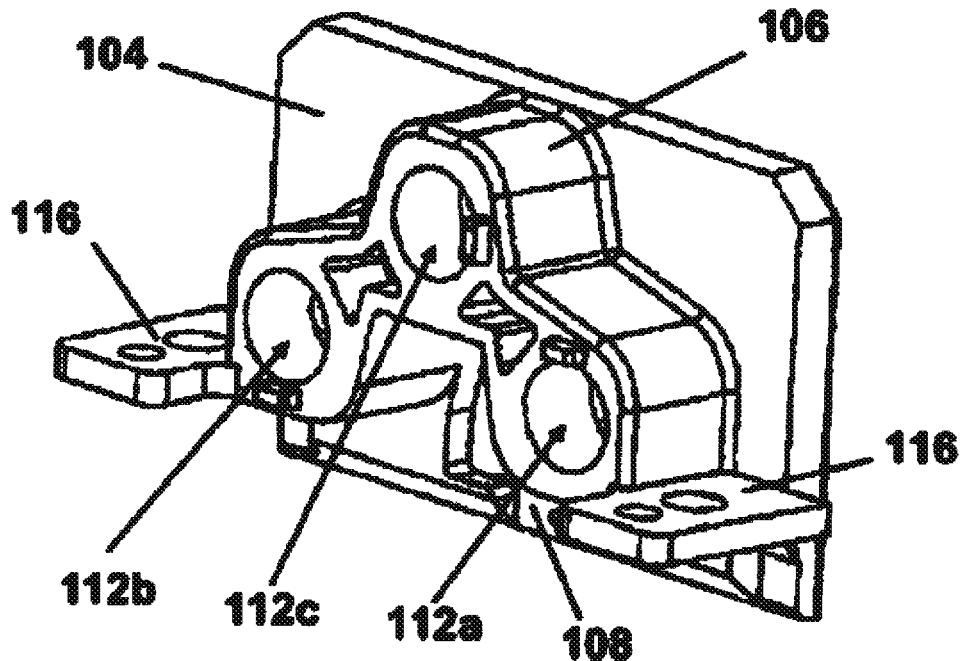

The image sensor 70 and its associated lens as well as the IR LEDs 84 are mounted on a housing assembly 100 that is best illustrated in FIGS. 4a and 4b. As can be seen, the housing assembly 100 comprises a polycarbonate housing body 102 having a front portion 104 and a rear portion 106 extending from the front portion. An imaging aperture 108 is centrally formed in the housing body 102 and accommodates an IR-pass/visible light blocking filter 110. The filter 110 has an IR-pass wavelength range of between about 830 nm and about 698 nm. The image sensor 70 and associated lens are positioned behind the filter 110 and oriented such that the field of view of the image sensor 70 looks through the filter 110 and generally across the interactive surface 24. The rear portion 106 is shaped to surround the image sensor 70. Three passages 112a to 112c are formed through the housing body 102. Passages 112a and 112b are positioned on opposite sides of the filter 110 and are in general horizontal alignment with the image sensor 70. Passage 112c is centrally positioned above the filter 110. Each tubular passage receives a light source socket 114 that is configured to receive a respective one of the IR LEDs 84. Mounting flanges 116 are provided on opposite sides of the rear portion 106 to facilitate connection of the housing assembly 100 to the bezel 26 via suitable fasteners. A label 118 formed of retro-reflective material overlies the front surface of the front portion 104. Further specifics concerning the housing assembly and its method of manufacture are described in U.S. patent application Ser. No. 12/709,419 to Liu et al. entitled "HOUSING ASSEMBLY FOR INTERACTIVE INPUT SYSTEM AND FABRICATION METHOD" filed on Feb. 19, 2010, the content of which is incorporated herein by reference in its entirety.

Figure 5:
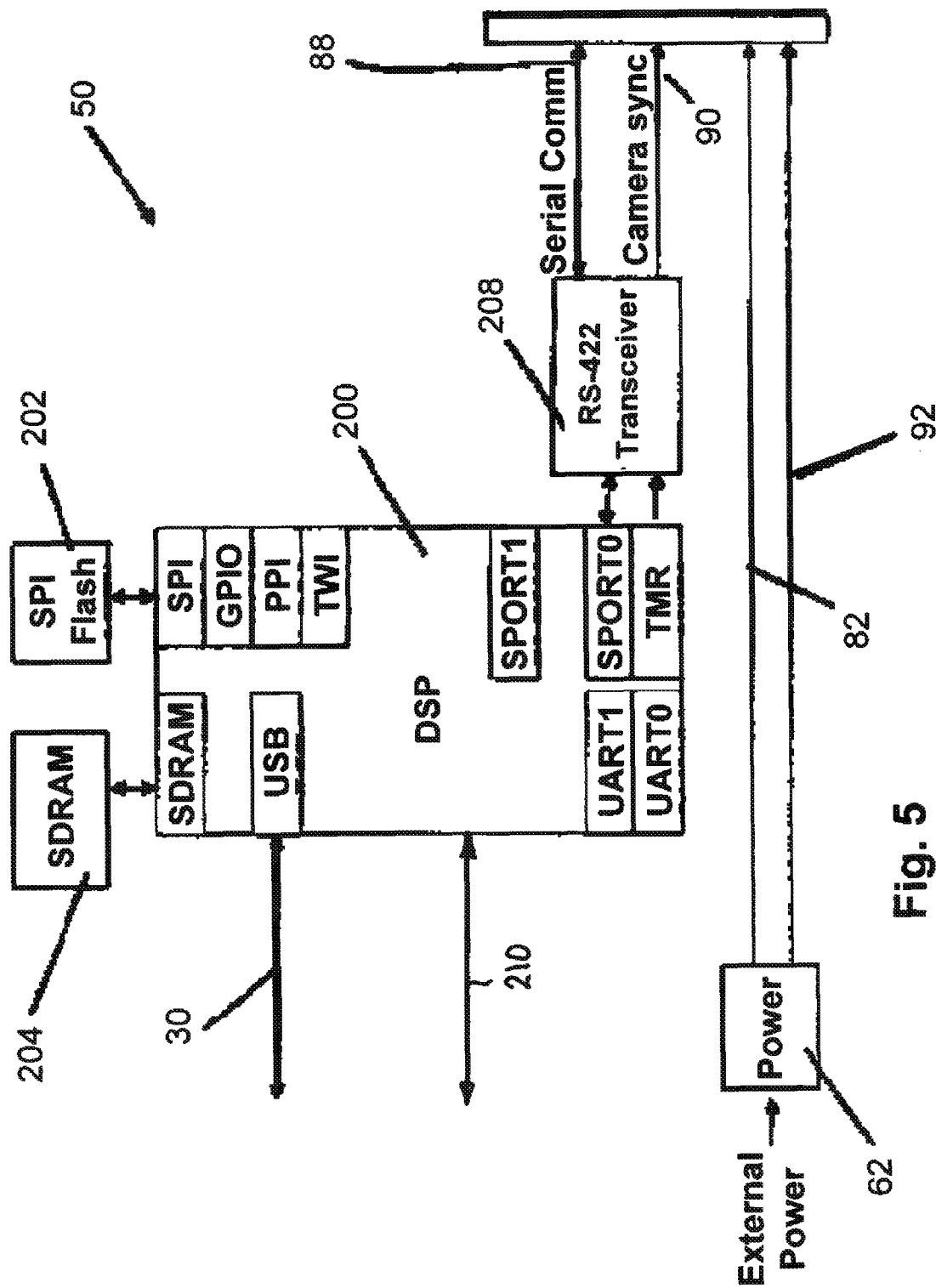
FIG. 5 is a block diagram of a master controller forming part of the interactive input system of FIG. 1.

The master controller 50 is better illustrated in FIG. 5. As can be seen, master controller 50 comprises a DSP 200 such as that manufactured by Analog Devices under part number ADSP-BF522 Blackfin or other suitable processing device. A serial peripheral interface (SPI) flash memory 202 is connected to the DSP 200 via an SPI port and stores the firmware required for master controller operation. A synchronous dynamic random access memory (SDRAM) 204 that stores temporary data necessary for system operation is connected to the DSP 200 via an SDRAM port. The DSP 200 communicates with the general purpose computing device 28 over the USB cable 30 via a USB port. The DSP 200 communicates through its serial port (SPORT) with the imaging assemblies 60 via an RS-422 transceiver 208 over the differential synchronous signal (DSS) communications link 88. In this embodiment, as more than one imaging assembly 60 communicates with the master controller DSP 200 over the DSS communications link 88, time division multiplexed (TDM) communications is employed. The DSP 200 also communicates with the imaging assemblies 60 via the RS-422 transceiver 208 over the camera synch line 90. DSP 200 communicates with the tool tray 48 over communications link 210.

As will be appreciated, the architectures of the imaging assemblies 60 and master controller 50 are similar. By providing a similar architecture between each imaging assembly 60 and the master controller 50, the same circuit board assembly and common components may be used for both thus reducing the part count and cost of the interactive input system 20. Differing components are added to the circuit board assemblies during manufacture dependent upon whether the circuit board assembly is intended for use in an imaging assembly 60 or in the master controller 50. For example, the master controller 50 may require a SDRAM 76 whereas the imaging assembly 60 may not.

The general purpose computing device 28 in this embodiment is a personal computer or other suitable processing device or structure comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computer components to the processing unit. The general purpose computing device 28 may also comprise a network connection to access shared or remote drives, one or more networked computing devices, and/or other networked devices.

Figure 6:
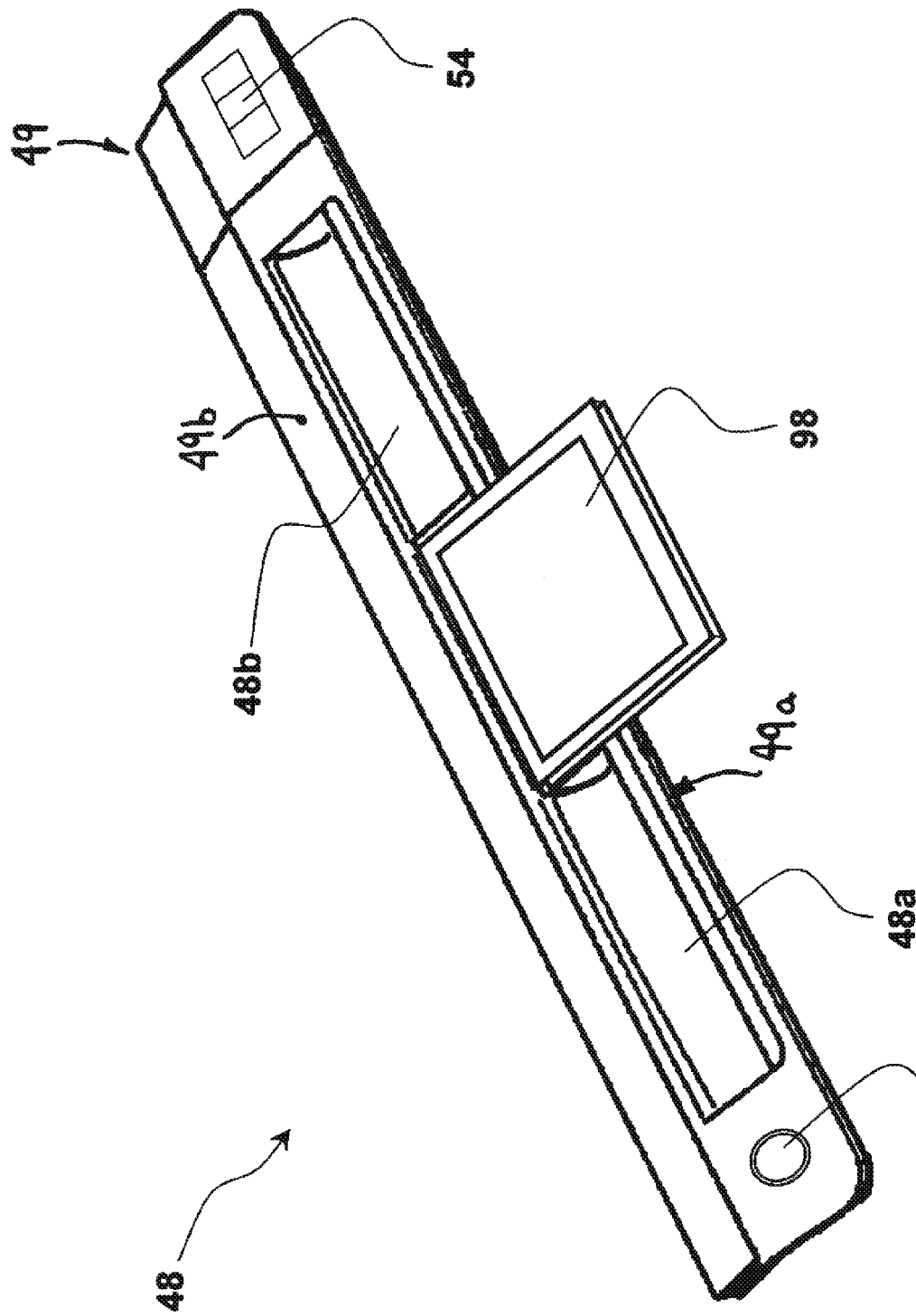
FIG. 6 is a perspective view of a tool tray forming part of the interactive input system of FIG. 1.
Figure 7:
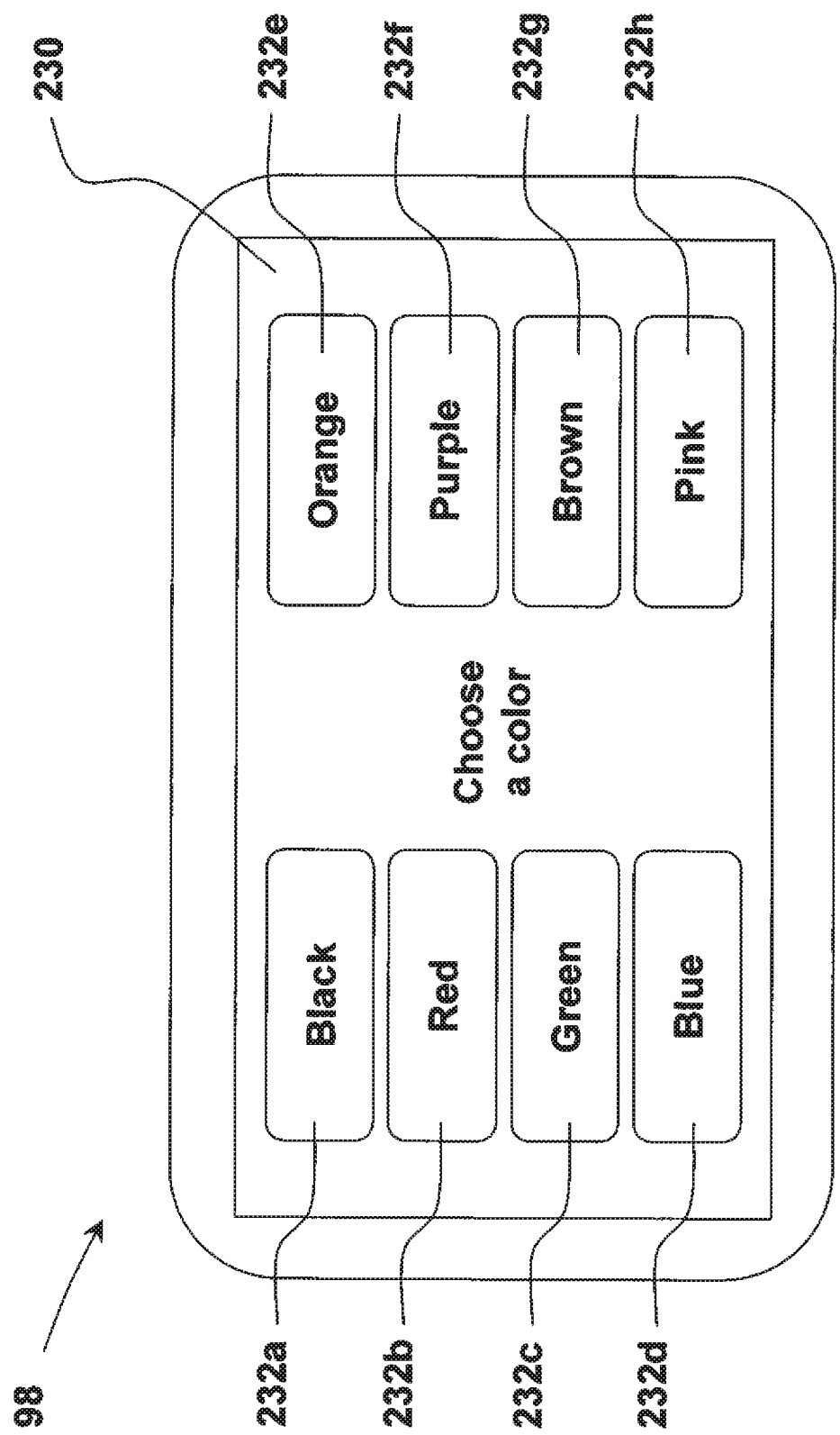
FIG. 7 shows a pointer colour selection screen displayed by a display of the tool tray of FIG. 6.

Turning now to FIGS. 6 and 7, the tool tray 48 is better illustrated. As can be se seen, the upper surface 49a of the housing 49 has a rear portion 49b with a generally planar surface that is shaped to abut an underside of the interactive board 22. The housing 49 of tool tray 48 accommodates a plurality of circuit card arrays (CCAs) or boards each supporting circuitry associated with functionality of the tool tray 48. A first main controller board (not shown) supports the master controller 50 and is responsible for controlling the overall functionality of the tool tray 48. The main controller board also comprises a USB connector (not shown) and a data connection port (not shown) for enabling connection to the imaging assemblies 60. The main controller board additionally has a power connection port (not shown) for enabling connection to the power adapter 62, and an audio output port (not shown) for enabling connection to one or more speakers.

The main controller board is connected to an attribute button control board (not shown) comprising tool sensors (not shown) that are associated with the receptacles 48a and 48b. The tool sensors are described in above-incorporated U.S. patent application Ser. No. 12/709,424 to Bolt et al. In this embodiment, the sensors are grouped into two pairs, with each pair being mounted as a set within a respective receptacle 48a or 48b. Each pair of sensors comprises an infrared (IR) transmitter and IR receiver for detecting the presence of a tool within its associated receptacle, whereby detection of a tool within the receptacle occurs as a result of the tool interrupting an infrared signal transmitted by the IR transmitter across the slot to the IR receiver. The attribute button control board is linked to a power module board on which the power button 52 is physically mounted, together with an LED contained within the power button for indicating power on/off status.

The tool tray 48 also comprises a display 98 that is centrally positioned on the upper surface of the tool tray housing 49 between receptacles 48a and 48b. Display 98 comprises a colour liquid crystal display (LCD) panel having a resistive touch layer disposed thereon. The resistive touch layer enables the display 98 to receive touch input, and thereby allows a user to interact with the display 98 using a pen tool P, a finger or other suitable object.

Display 98 is connected to the power adaptor 62 through a display control board (not shown) housed within the tool tray 48 thereby to allow a user to switch power on and off to selected components of the interactive input system 20, such as for example the projector, through touch interaction with the display 98. A microcontroller (not shown) having an embedded Linux operating system for controlling the operation of the display 98 is mounted on the display control board. The microcontroller is also in communication with the master controller 50, enabling touch input made on the display 98 to be reflected in images displayed on the interactive surface 24, and also enabling touch input made on the interactive surface 24 to be reflected in images presented on the display 98. As will be understood, since the interactive surface 24 and display 98 are each connected to, and controlled by, separate controllers, input events on the display 98 will not shift focus away from, or interrupt programs running on the general purpose computing device 28 and displayed on the interactive surface 24. In this manner, display 98 is not merely an extension of any "desktop environment" displayed on the interactive surface 24, but rather functions as a separate "environment" simultaneously with any "environment" displayed on the interactive surface 24.

The display control board is also in communication with the attribute button control board. As a result, display 98 is configured to display a pointer attribute selection screen whenever a pen tool P is removed from a receptacle 48a or 48b as detected by the sensors associated with the receptacle. In this embodiment, the pointer attribute selection screen is a pointer colour selection screen 230 as shown in FIG. 7. As can be seen, the pointer colour selection screen 230 comprises a plurality of virtual buttons 232a to 232h. Each of the buttons 232a to 232h is associated with a different pointer colour, wherein buttons 232a, 232b, 232c, 232d, 232e, 232f, 232g and 232h are associated with black, red, green, blue, orange, purple, brown and pink pointer colours, respectively. Selection of any of the buttons 232a to 232h automatically assigns a pointer mode to subsequent pointer input made on the interactive surface 24. For example, selection of virtual button 232b, assigns the pointer mode to subsequent pointer input and sets the pointer colour to red. As a result, when a pointer is brought into contact with and moved across the interactive surface 24, the resulting pointer data that is provided to the general purpose computing device 28 by the interactive board 22 is treated as red digital ink and is used to update the image displayed on the interactive surface 24 accordingly. Also, when one of the buttons 232a to 232h is selected, the selected button blinks to provide a visual indication that the attributed pointer colour is active. When the button associated with the active colour is selected again, the active status indication is cancelled and the pointer input mode reverts to a default pointer mode so that subsequent pointer contacts on the interactive surface 24 are treated as mouse events.

The tool tray 48 is configured to provide functionality for either a single user or multiple users. When sensors detect the removal of a pen tool P from only one of the receptacles 48a or 48b, the display control board determines that only a single user is interacting with the interactive board 22 and notifies the master controller 50. The master controller 50 in turn configures the interactive board 22 to operate in a "single-screen" display mode. In this embodiment, the "single-screen" display mode is the default display mode. As a result, all pointer contacts with the interactive surface 24 are treated as being made by the same user. When the sensors detect the removal of pen tools P from both receptacles 48a and 48b, the display control board determines that multiple users are interacting with the interactive board 22 and notifies the master controller 50. The master controller 50 in turn configures the interactive board 22 to operate in a "split-screen" mode. In the split-screen mode, the interactive surface 24 is partitioned into two side-by-side screen portions. Pointer input made on each screen portion of the interactive surface 24 is treated as pointer input made by different users. In this embodiment, selection of one of the buttons 232a to 232h while the in split-screen mode assigns the associated pointer colour to all subsequent pointer input made on both screen portions of the interactive surface 24.

Figure 8A:
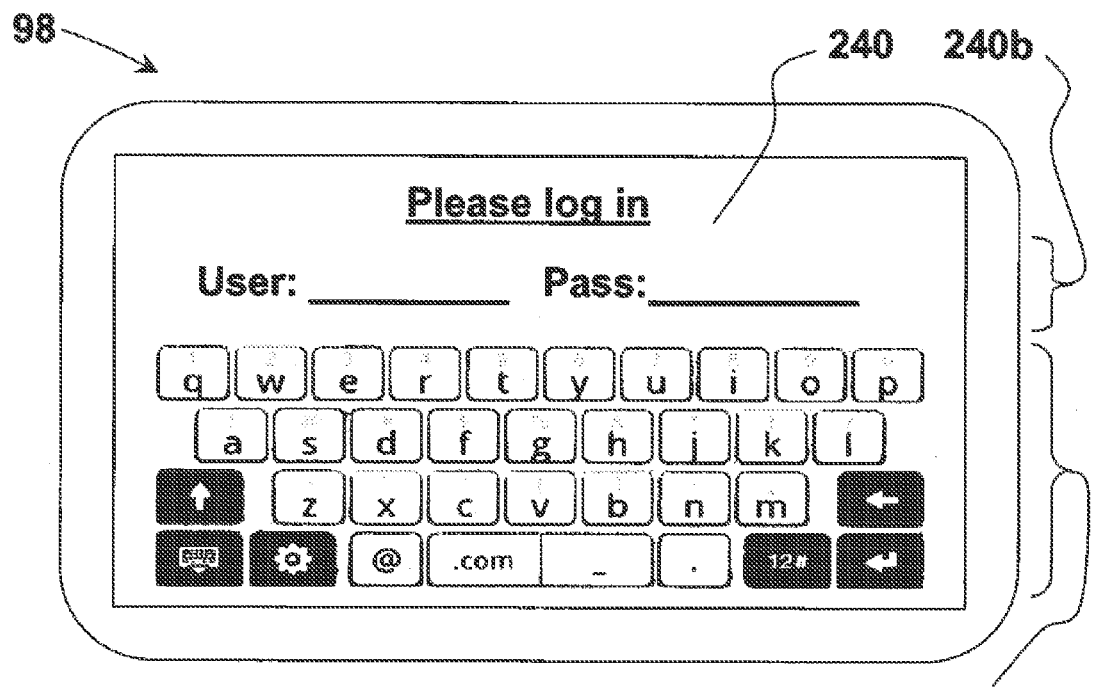
FIGS. 8a to 8h show a user login screen, a home screen, a meeting schedule screen, a pointer attribute selection screen, an eraser attribute selection screen, an insert object screen, a settings screen, and a logout screen, respectively, displayed by the display of the tool tray of FIG. 7.

Display 98 is also configured to display other information and to provide selectability of other pointer input attributes. For example, display 98 is also configured to display a login screen 240, a home screen 242, a scheduling screen 244, a pointer attribute screen 246, an eraser attribute screen 248, an insert object screen 250, a settings screen 252, and a logout screen 254, as shown in FIGS. 8a to 8h, respectively. FIG. 8a better illustrates the login screen 240, which is displayed on display 98 when the interactive input system 20 is powered on. Login screen 240 comprises an on-screen keyboard 240a, and user name and password fields 240b. The on-screen keyboard 240a allows a user to log into the interactive input system 20 by entering their user name and password into the fields 240b. Once a correct user name/password combination has been entered, settings and files associated with the user may be accessed through interactions with the interactive surface 24.

Figure 8B:
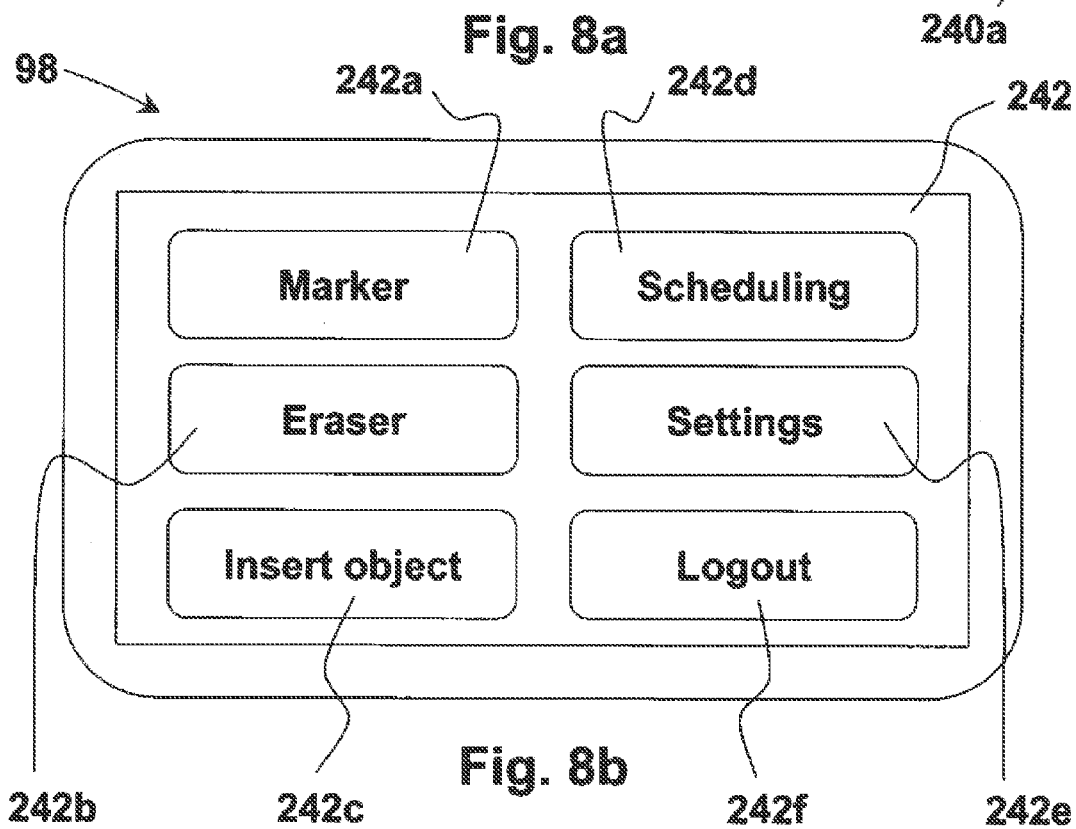

FIG. 8b better illustrates the home screen 242, which is displayed on display 98 after a user has logged into the interactive input system 20 using login screen 240. Home screen 242 comprises a plurality of virtual buttons 242a to 242f, each of which is selectable through touch input with the display 98 to display screens 244 to 254.

Figure 8C:
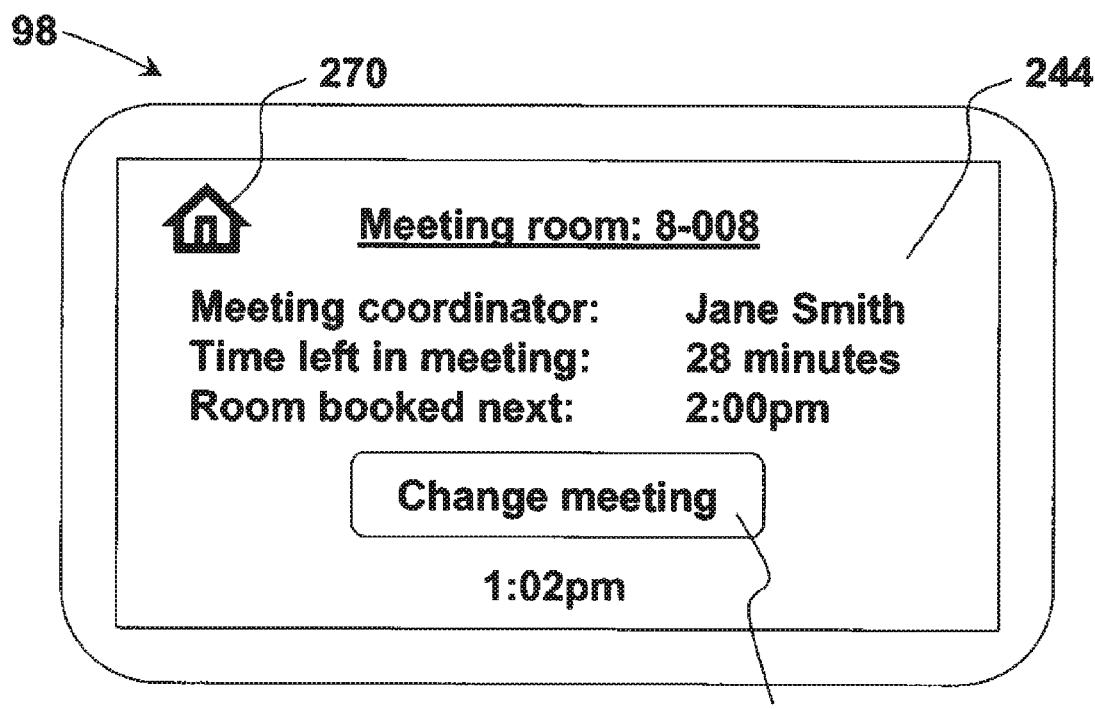

FIG. 8c shows the scheduling screen 244, which is displayed when the scheduling button 242d on the home screen 242 is selected. As can be seen, the scheduling screen 244 comprises information pertaining to status of a current meeting, such as for example a meeting room identifier, a meeting coordinator name, the amount of time remaining in the current meeting, the current time of day, the number of participants (not shown), names of participants (not shown), conflicting meeting notes (not shown), and the time of next booking of the meeting room. Scheduling screen 244 also comprises a Change Meeting virtual button 244a, which may be selected to display a change meeting screen 256 (not shown) on display 98. Change meeting screen 256 comprises virtual buttons (not shown) each associated with a respective meeting-related function similar to functions provided by Microsoft Office Outlook®, and which may be selected for executing the meeting-related functions. These meeting-related functions may comprise, for example, cancelling the meeting, pausing the meeting, extending the meeting, moving the meeting to a different location or time, and inviting additional participants. As will be appreciated, enabling such meeting-related actions to be executed through touch input with display 98, instead of through interaction with interactive surface 24, provides both increased privacy and ease-of-use. Scheduling screen 244 also provides an indication when a meeting is about to end by causing the scheduling screen 244 to blink red and to display a "meeting end" message. The indication can be stopped by touching the display 98. Scheduling screen 244 also comprises a home button 270, which is selectable to return to the home screen 242.

Figure 8D:
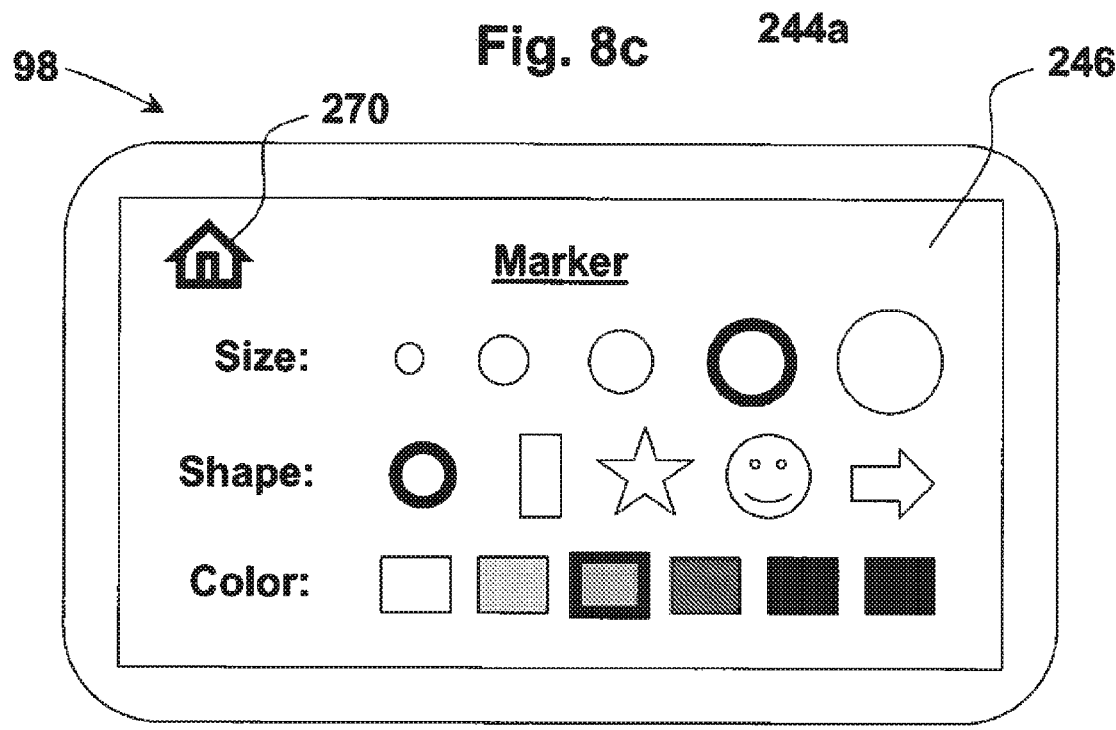

FIG. 8d shows the pointer attribute screen 246, which is displayed when the pointer button 242a on the home screen 242 is selected. As can be seen, the pointer attribute screen 246 comprises a plurality of virtual buttons that are each selectable by a user for assigning a pointer attribute to subsequent pointer input. Selection of any of the virtual buttons on pointer attribute screen 246 automatically assigns the pointer mode to subsequent pointer input made on the interactive surface 24. Here, the subsequent pointer input may be from any pointer, such as for example a pen tool P, an eraser tool, a finger or other object, and for example while both pen tools P are present within receptacles 48a and 48b. In the embodiment shown, the pointer attributes comprise pointer size, pointer shape, and pointer colour. Each of these pointer attributes may be assigned to subsequent pointer input by selecting the virtual button associated with the attribute. In this embodiment, when a virtual button is selected, the thickness of the border surrounding the selected virtual button increases to indicate the active status of the pointer attribute associated with that button. Additionally, a pointer colour selection made using pointer attribute screen 246 overrides any previous selection made using colour selection screen 230. Similarly, any subsequent pointer colour selection made using colour selection screen 230 overrides any previous selection made using pointer attribute screen 246. Pointer attribute screen 246 also comprises a home button 270 that may be selected to return to the home screen 270.

Figure 8E:
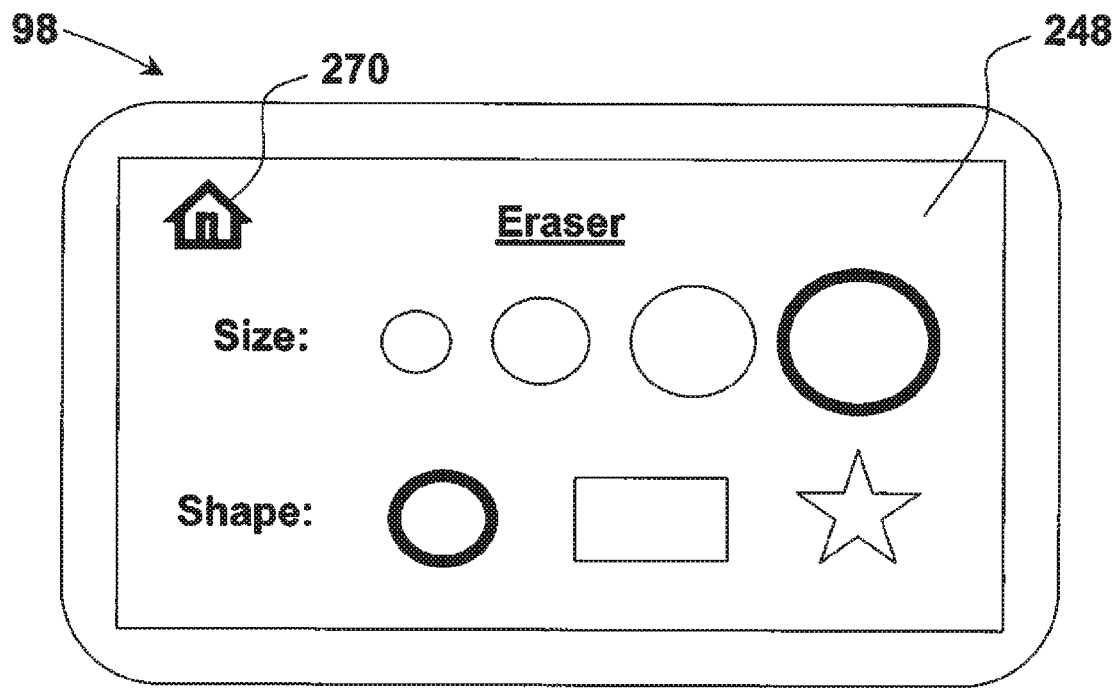

FIG. 8e shows the eraser attribute screen 248, which is displayed when the eraser button 242b on the home screen 242 is selected. As can be seen, the eraser attribute screen 248 comprises a plurality of virtual buttons that are each selectable by a user for assigning an eraser attribute to subsequent pointer input. Selection of any of the virtual buttons on eraser attribute screen 248 automatically assigns the eraser mode to subsequent pointer input made on the interactive surface 24. Here, the subsequent pointer input may be from any pointer, such as for example a pen tool P, an eraser tool, a finger or other object, and for example while both pen tools P are present within receptacles 48a and 48b. In the embodiment shown, the eraser attributes comprise eraser size and eraser shape. Each of these eraser attributes may be assigned by selecting the virtual button associated with that attribute. When a virtual button is selected, the thickness of the border surrounding the selected virtual button increases to indicate the active status of the eraser attribute associated with that button. Eraser attribute screen 248 also comprises a home button 270 that may be selected to return to the home screen 242.

Figure 8F:
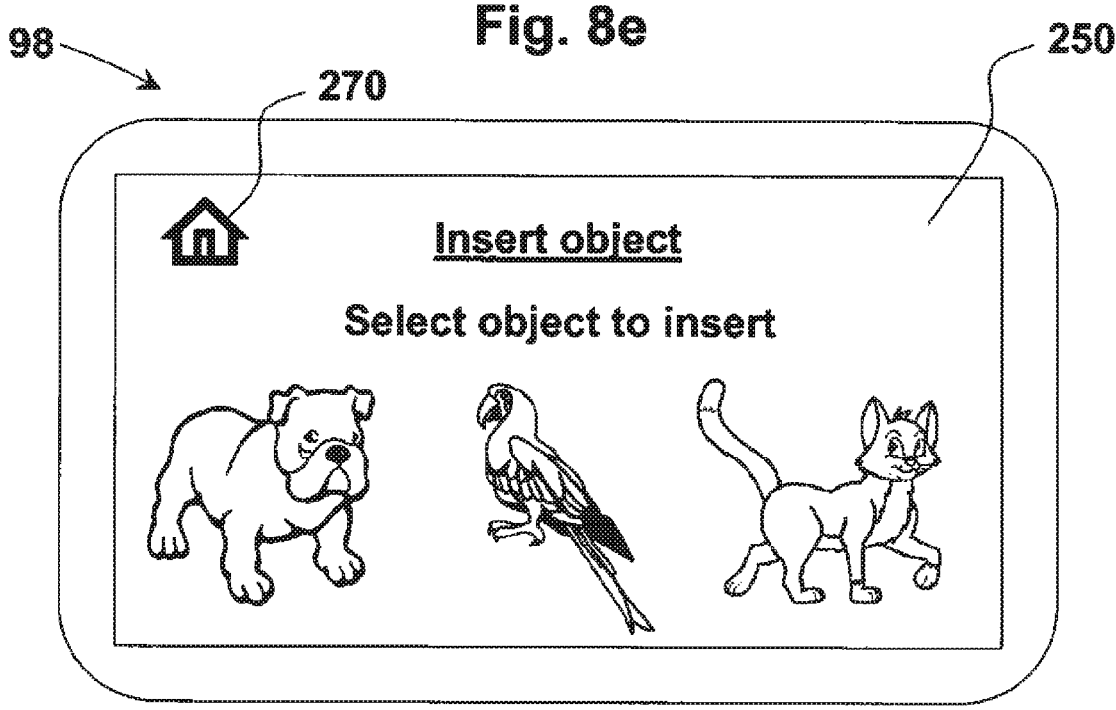

FIG. 8f shows the insert object screen 250, which is displayed when the insert object button 242a on the home screen 242 is selected. As can be seen, the insert object screen 250 comprises a plurality of virtual buttons that are each selectable by a user for assigning an object insertion attribute to subsequent pointer input made on the interactive surface 24. Selection of any of the virtual buttons on insert object screen 250 automatically assigns an object insertion mode to subsequent pointer input. Here, the subsequent pointer input may be from any pointer, such as for example a pen tool P, an eraser tool, a finger or other object, and for example while both pen tools P are present within receptacles 48a and 48b. In the embodiment shown, the object insertion attributes are animal images. Each of these object insertion attributes may be assigned by selecting the virtual button associated with that attribute. When a virtual button is selected, the thickness of the border surrounding the selected virtual button increases to indicate the active status of the attribute associated with that button. Insert object screen 250 also comprises a home button 270 that may be selected to return to the home screen 242.

Figure 8G:
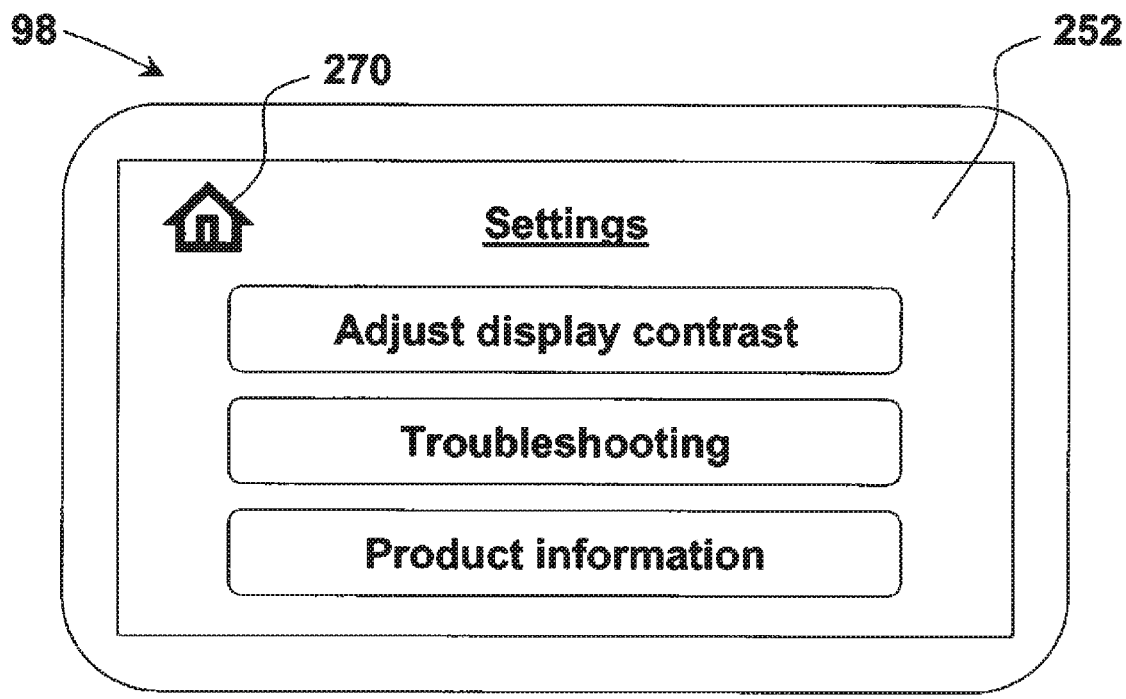

FIG. 8g shows the settings screen 252, which is displayed when the settings button 242e on the home screen 242 is selected. As can be seen, the setting screen 252 comprises a plurality of virtual buttons that are each selectable by a user for accessing various service functions and information pages generally relating to the interactive input system 20. In the embodiment shown, the virtual buttons are selectable for adjusting display contrast, for troubleshooting, and for viewing product information. Settings screen 252 also comprises a home button 270 that may be selected to return to the home screen 242.

Figure 8H:
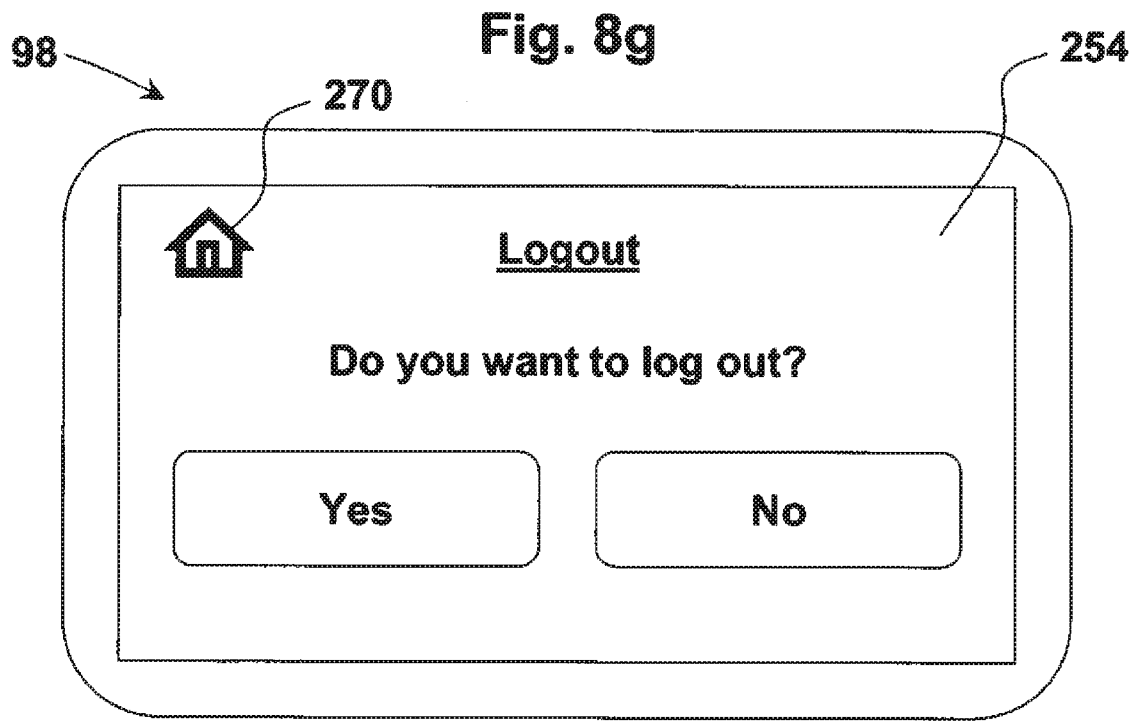

FIG. 8h shows the logout screen 254, which is displayed when the logout button 242f on the home screen 242 is selected. As can be seen, the logout screen comprises a message prompting a user if he or she would like to logout, and a pair of "yes" and "no" virtual buttons that are each selectable for either logging out or not logging out that user. The logout screen 254 also comprises a home button 270 that may be selected to return to the home screen 242.

During operation, the DSP 200 of the master controller 50 outputs synchronization signals that are applied to the synch line 90 via the transceiver 208. Each synchronization signal applied to the synch line 90 is received by the DSP 72 of each imaging assembly 60 via transceiver 86 and triggers a non-maskable interrupt (NMI) on the DSP 72. In response to the non-maskable interrupt triggered by the synchronization signal, the DSP 72 of each imaging assembly 60 ensures that its local timers are within system tolerances and if not, corrects its local timers to match the master controller 50. Using one local timer, the DSP 72 initiates a pulse sequence via the snapshot line that is used to condition the image sensor to the snapshot mode and to control the integration period and frame rate of the image sensor 70 in the snapshot mode. The DSP 72 also initiates a second local timer that is used to provide output on the LED control line 174 so that the IR LEDs 84 are properly powered during the image frame capture cycle.

In use, the image sensor 70 of each imaging assembly 60 acquires image frames at the desired image frame rate in response to the pulse sequence output on the snapshot line. In this manner, image frames captured by the image sensor 70 of each imaging assembly 60 can be referenced to the same point of time allowing the position of pointers brought into the fields of view of the image sensors 70 to be accurately triangulated. Also, by distributing the synchronization signals for the imaging assemblies 60, electromagnetic interference is minimized by reducing the need for transmitting a fast clock signal to each image assembly 60 from a central location. Instead, each imaging assembly 60 has its own local oscillator (not shown) and a lower frequency signal (e.g. the point rate, 120 Hz) is used to keep the image frame capture synchronized.

During image frame capture, the DSP 72 of each imaging assembly 60 also provides output to the strobe circuits 80 to control the switching of the IR LEDs 84 so that the IR LEDs are illuminated in a given sequence that is coordinated with the image frame capture sequence of each image sensor 70. In particular, in the sequence the first image frame is captured by the image sensor 70 when the IR LED 84 accommodated by the socket 114 in passage 112c is fully illuminated in a high current mode and the other IR LEDs are off. The next image frame is captured when all of the IR LEDs 84 are off. Capturing these successive image frames with the IR LED 84 on and then off allows ambient light artifacts in captured image frames to be cancelled by generating difference image frames as described in U.S. Application Publication No. 2009/0278794 to McReynolds et al., assigned to SMART Technologies ULC, the content of which is incorporated herein by reference in its entirety. The third image frame is captured by the image sensor 70 when only the IR LED 84 accommodated by the socket 114 in passage 112a is on and the fourth image frame is captured by the image sensor 70 when only the IR LED 84 accommodated by the socket 114 in passage 112b is on. Capturing these image frames allows pointer edges and pointer shape to be determined as described in International PCT Application Serial No. PCT/CA2011/000036 to SMART Technologies ULC et al. entitled 'INTERACTIVE INPUT SYSTEM AND ILLUMINATION SYSTEM THEREFOR' filed on Jan. 14, 2011, the content of which is incorporated herein by reference in its entirety. The strobe circuits 80 also control the IR LEDs 84 to inhibit blooming and to reduce the size of dark regions in captured image frames that are caused by the presence of other imaging assemblies 60 within the field of view of the image sensor 70 as will now be described.

During the image capture sequence, when each IR LED 84 is on, the IR LED floods the region of interest over the interactive surface 24 with infrared illumination. Infrared illumination that impinges on the retro-reflective bands of bezel segments 40, 42, 44 and 46 and on the retro-reflective labels 118 of the housing assemblies 100 is returned to the imaging assemblies 60. As a result, in the absence of a pointer, the image sensor 70 of each imaging assembly 60 sees a bright band having a substantially even intensity over its length together with any ambient light artifacts. When a pointer is brought into proximity with the interactive surface 24, the pointer occludes infrared illumination reflected by the retro-reflective bands of bezel segments 40, 42, 44 and 46 and/or the retro-reflective labels 118. As a result, the image sensor 70 of each imaging assembly 60 sees a dark region that interrupts the bright band in captured image frames. The reflections of the illuminated retro-reflective bands of bezel segments 40, 42, 44 and 46 and the illuminated retro-reflective labels 118 appearing on the interactive surface 24 are also visible to the image sensor 70.

Figure 9A:
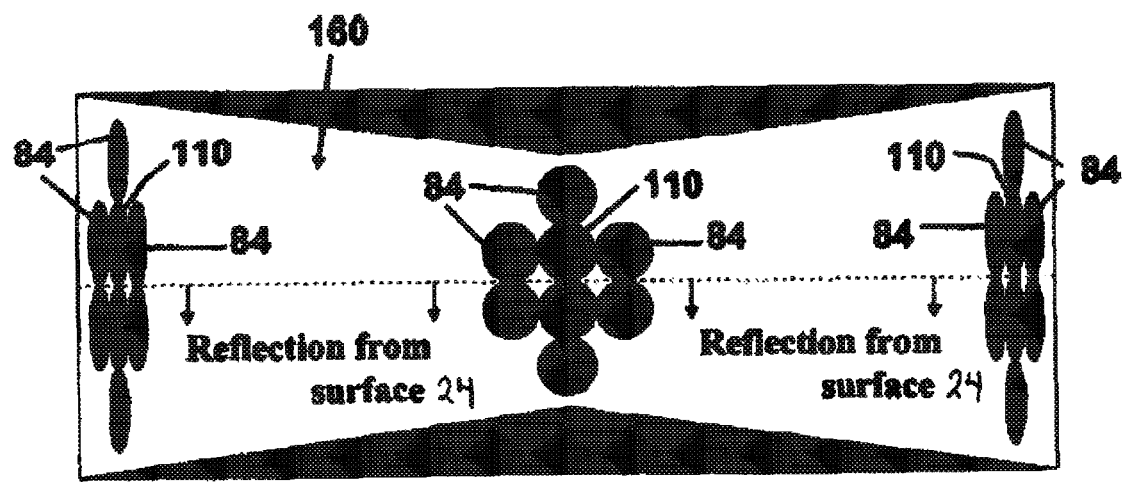
FIG. 9a is a simplified exemplary image frame captured by the imaging assembly of FIG. 3 when IR LEDs associated with other imaging assemblies of the interactive input system are in an off state.

FIG. 9a shows an exemplary image frame captured by the image sensor 70 of one of the imaging assemblies 60 when the IR LEDs 84 associated with the other imaging assemblies 60 are off during image frame capture. As can be seen, the IR LEDs 84 and the filter 110 of the other imaging assemblies 60 appear as dark regions that interrupt the bright band 160. These dark regions can be problematic as they can be inadvertently recognized as pointers.

Figure 9B:
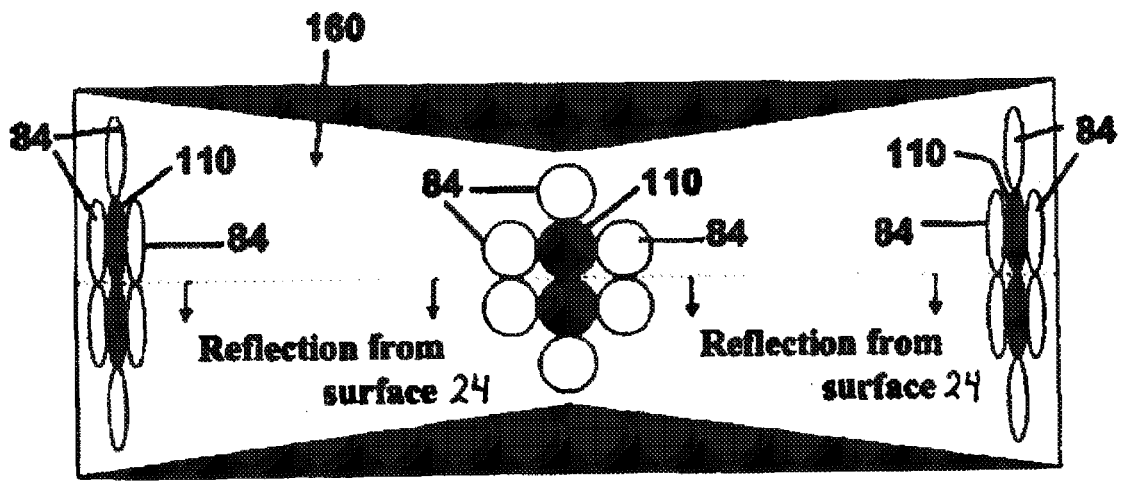
FIG. 9b is a simplified exemplary image frame captured by the imaging assembly of FIG. 3 when IR LEDs associated with other imaging assemblies of the interactive input system are in a low current on state.

To address this problem, when the image sensor 70 of one of the imaging assemblies 60 is capturing an image frame, the strobe circuits 80 of the other imaging assemblies 60 are conditioned by the DSPs 72 to a low current mode. In the low current mode, the strobe circuits 80 control the operating power supplied to the IR LEDs 84 so that they emit infrared lighting at an intensity level that is substantially equal to the intensity of illumination reflected by the retro-reflective bands on the bezel segments 40, 42, 44 and 46 and by the retro-reflective labels 118. FIG. 9b shows an exemplary image frame captured by the image sensor 70 of one of the imaging assemblies 60 when the IR LEDs 84 associated with the other imaging assemblies 60 are operated in the low current mode. As a result, the size of each dark region is reduced. Operating the IR LEDs 84 in this manner also inhibits blooming (i.e. saturation of image sensor pixels) which can occur if the IR LEDs 84 of the other imaging assemblies 60 are fully on during image frame capture. The required levels of brightness for the IR LEDs 84 in the low current mode are related to the distance between the image sensor 70 and the opposing bezel segments 40, 42, 44, and 46. Generally, lower levels of brightness are required as the distance between the image sensor 70 and the opposing bezel segments 40, 42, 44, and 46 increases due to the light loss within the air as well as inefficient distribution of light from each IR LED towards the bezel segments 40, 42, 44, and 46.

The sequence of image frames captured by the image sensor 70 of each imaging assembly 60 is processed by the DSP 72 to identify each pointer in each image frame and to obtain pointer shape and contact information as described in above-incorporated International PCT Application Serial No. PCT/CA2011/000036 to SMART Technologies ULC et al. The DSP 72 of each imaging assembly 60 in turn conveys the pointer data to the DSP 200 of the master controller 50. The DSP 200 uses the pointer data received from the DSPs 72 to calculate the position of each pointer relative to the interactive surface 24 in (x,y) coordinates using well known triangulation as described in above-incorporated U.S. Pat. No. 6,803,906 to Morrison. This pointer coordinate data along with pointer shape and pointer contact status data is conveyed to the general purpose computing device 28 allowing the image data presented on the interactive surface 24 to be updated to reflect pointer activity and in accordance with pointer attributes assigned to pointer input through interactions with screens presented on the display 98.

Interactive input system 20 is not limited to use with tool tray 48 described above. If desired, the ends of the housing 49 of the tool tray 48 may be configured to receive detachable modules to provide the tool tray 48 with increased functionality as described in above-incorporated U.S. Application Nos. 61/294,831 and Ser. No. 12/709,424, to Bolt et al. Also, those of skill in the art will appreciate that still other tool tray configurations alternatively be employed.

For example, FIG. 10 shows another embodiment of a tool tray for use with interactive input system 20, and which is generally indicated by reference numeral 348. Tool tray 348 is generally similar to tool tray 48 described above with reference to FIGS. 6 to 8. In this embodiment however, tool tray 348 comprises two (2) displays 398a and 398b with each display being positioned adjacent an opposite end of the tool tray 348. Tool tray 348 also comprises two (2) receptacles 348a and 348b each sized to receive a respective pen tool P1 and P2, as shown. Each of the receptacles 348a and 348b is associated with a respective one of the display 398a and 398b. Display 398a is configured to display a pointer colour selection screen (not shown) that is similar to pointer colour selection screen 230 described above and with reference to FIG. 7, upon removal of pen tool P1 from receptacle 348a and display 398b is configured to display a similar pointer colour selection screen upon removal of pen tool P2 from receptacle 348b. As will be appreciated, by providing pointer colour selection screens on separate displays, each associated with an individual receptacle, a different colour may be assigned to pointer input made on the interactive surface 24 from each of the pen tools P1 and P2 in an independent manner. Here, the interactive board 22 differentiates between pen tools P1 and P2 when it is configured to operate in the split-screen mode. In this mode, each screen portion of the interactive surface 24 is associated with a respective one of the receptacles 348a and 348b, and therefore also with a respective pen tool P1 or P2 associated with each receptacle. The pen tools can also be differentiated if they are active pen tools that are each uniquely identifiable, such as those described in U.S. patent application Ser. No. 12/752,630 to McGibney et al., entitled "Interactive Input System and Information Input Method Therefor", filed on Apr. 1, 2010, and assigned to SMART Technologies ULC, the content of which is herein incorporated by reference in its entirety. Tool tray 348 also comprises an eraser tool receptacle 350 sized to receive a respective eraser tool 352.

Figure 11:
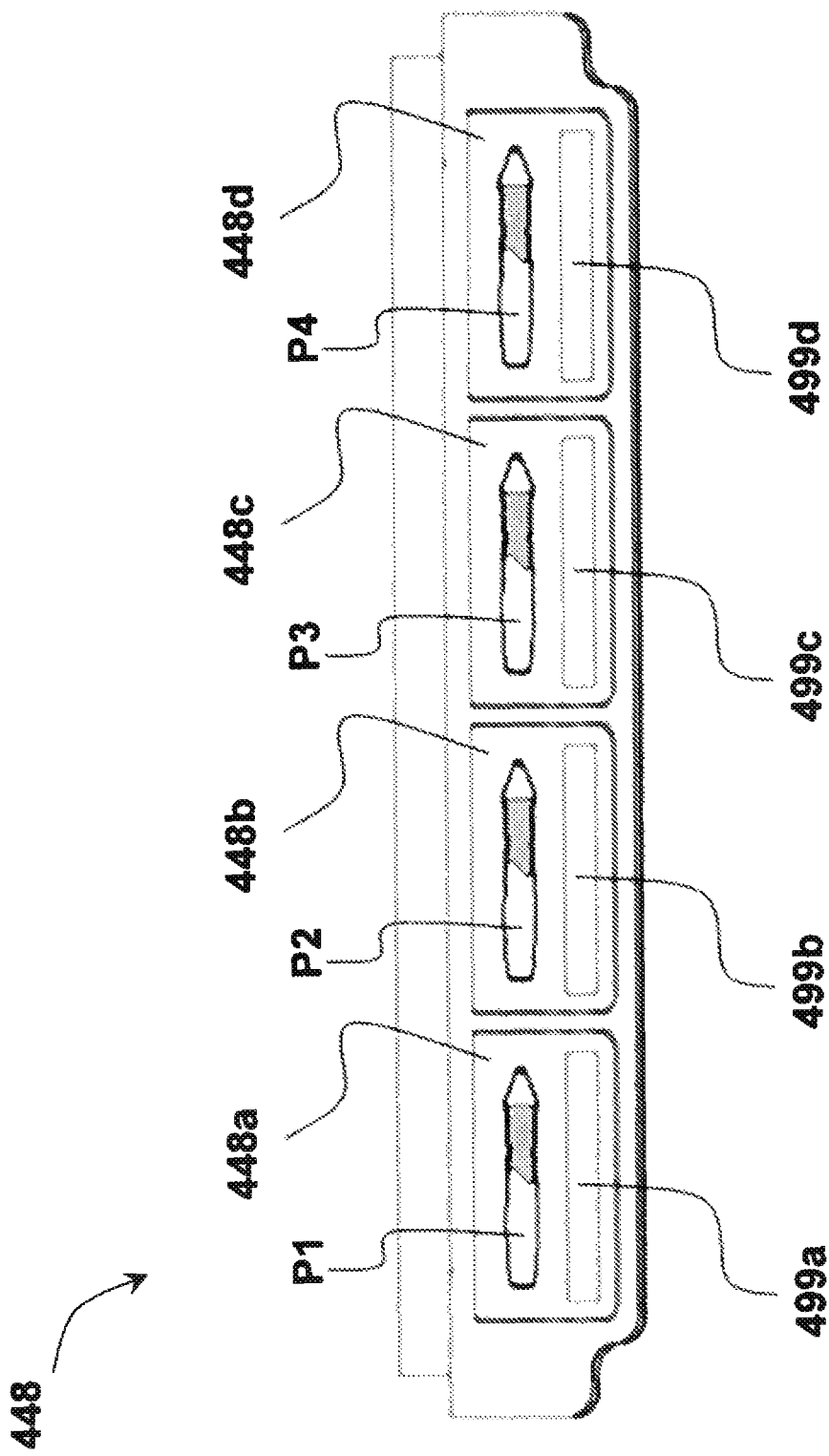
FIG. 11 is a plan view of yet another embodiment of a tool tray forming part of the interactive input system of FIG. 1.

FIG. 11 shows yet another embodiment of a tool tray for use with interactive input system 20, and which is generally indicated by reference numeral 448. Tool tray 448 is generally similar to tool tray 48 described above and with reference to FIGS. 6 to 8. In this embodiment however, tool tray 448 comprises four (4) receptacles 448a to 448d each sized to receive a respective pen tool P1 to P4. Pen tools P1 to P4 are active pen tools that are each uniquely identifiable, such as those described in above-incorporated U.S. application Ser. No. 12/752,630 to McGibney et al. Tool tray 448 also comprises four (4) displays 499a to 499d each associated with and positioned adjacent a respective receptacle 448a to 448d.

Each display 499*a* to 499*d* comprises a touch sensitive layer thereon configured to receive touch input. Each display 499*a* to 499*d* is sized to display a single line of text and is configured to display an attribute currently associated with its respective pen tool P1 to P4. In this embodiment, the attribute is any of a pointer input mode and a pointer colour assigned to the pen tool. Here, the pointer input mode may be any of a pointer mode, a pointer mode, and an eraser mode. Displays 499*a* to 499*d* are also configured to display a virtual arrow button (not shown) that when selected, scrolls through the available pointer input modes. Each pointer input mode displayed is selectable through touch input with the display 499*a* to 499*d* thereby to allow that pointer input mode to be assigned to subsequent pointer input made on the interactive surface 24 using the respective pen tool P1 to P4. When in the pointer mode, displays 499*a* to 499*d* display the active pointer colour. Here, the active pointer colour assigned to each pen tool P1 to P4 is selected from a menu displayed on the interactive surface 24.

Figure 12:
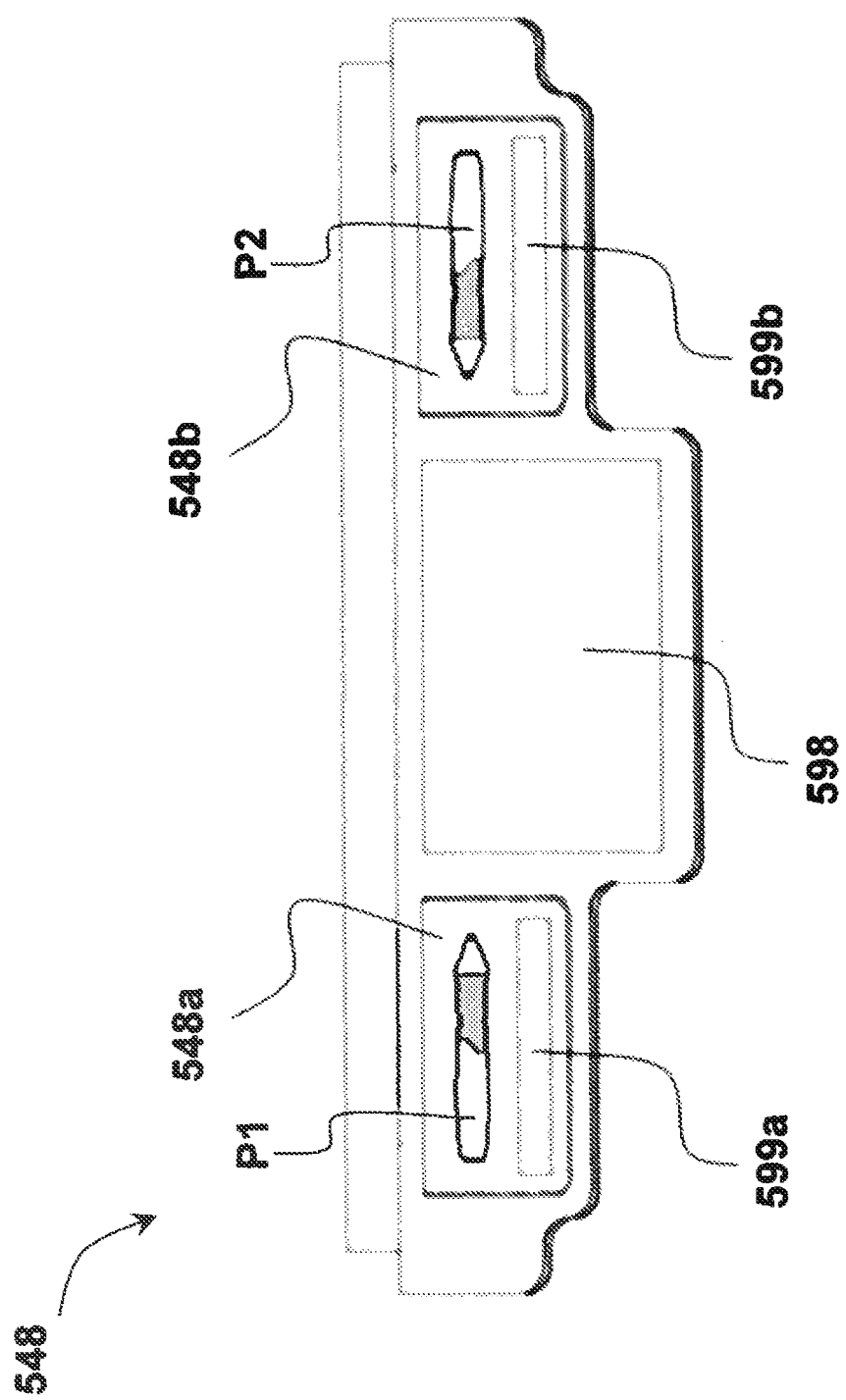
FIG. 12 is a plan view of still yet another embodiment of a tool tray forming part of the interactive input system of FIG. 1.

FIG. 12 shows still yet another embodiment of a tool tray for use with interactive input system 20, and which is generally indicated by reference numeral 548. Tool tray 548 is generally similar to tool tray 48 described above and with reference to FIGS. 6 to 8. In this embodiment, tool tray 548 comprises two (2) receptacles 548*a* and 548*b*, each sized to receive a respective pen tool P1 and P2. Tool tray 548 also comprises a display 598 that is generally similar to display 98 as well as two (2) displays 599*a* and 599*b*, each of which is associated with and positioned adjacent a respective receptacle 548*a* and 548*b*. Displays 599*a* and 599*b* are generally similar to displays 499*a* to 499*d* described above and with reference to FIG. 11, and are sized to display a single line of text. Displays 599*a* to 599*d* comprise a touch sensitive layer thereon configured to receive touch input. In this embodiment, display 599*a* is configured to indicate a current pointer input mode of the pen tool P1 in the receptacle 548*a* and display 599*b* is configured to indicate a current pointer input mode of the pen tool P2 in receptacle 548*b*. When a pen tool P1 or P2 is removed from its respective receptacle 548*a* or 548*b*, the respective display 599*a* or 599*b* displays a set of virtual buttons each of which is associated with a pointer colour. Selection of one of the virtual buttons assigns that colour to subsequent pointer input made on the interactive surface 24 using pen tool P1 or P2 or other pointer, and also overrides any colour previously assigned to that pen tool P1 or P2. If the interactive board 22 is configured to operate in the single-screen mode, the pen tool remaining in the other receptacle is also assigned the colour selected for the pen tool that has been removed. Alternatively, if the interactive board 22 is configured to operate in the split-screen mode, the pen tool remaining in the other receptacle is not assigned the colour selected for the pen tool that has been removed.

Figure 13:
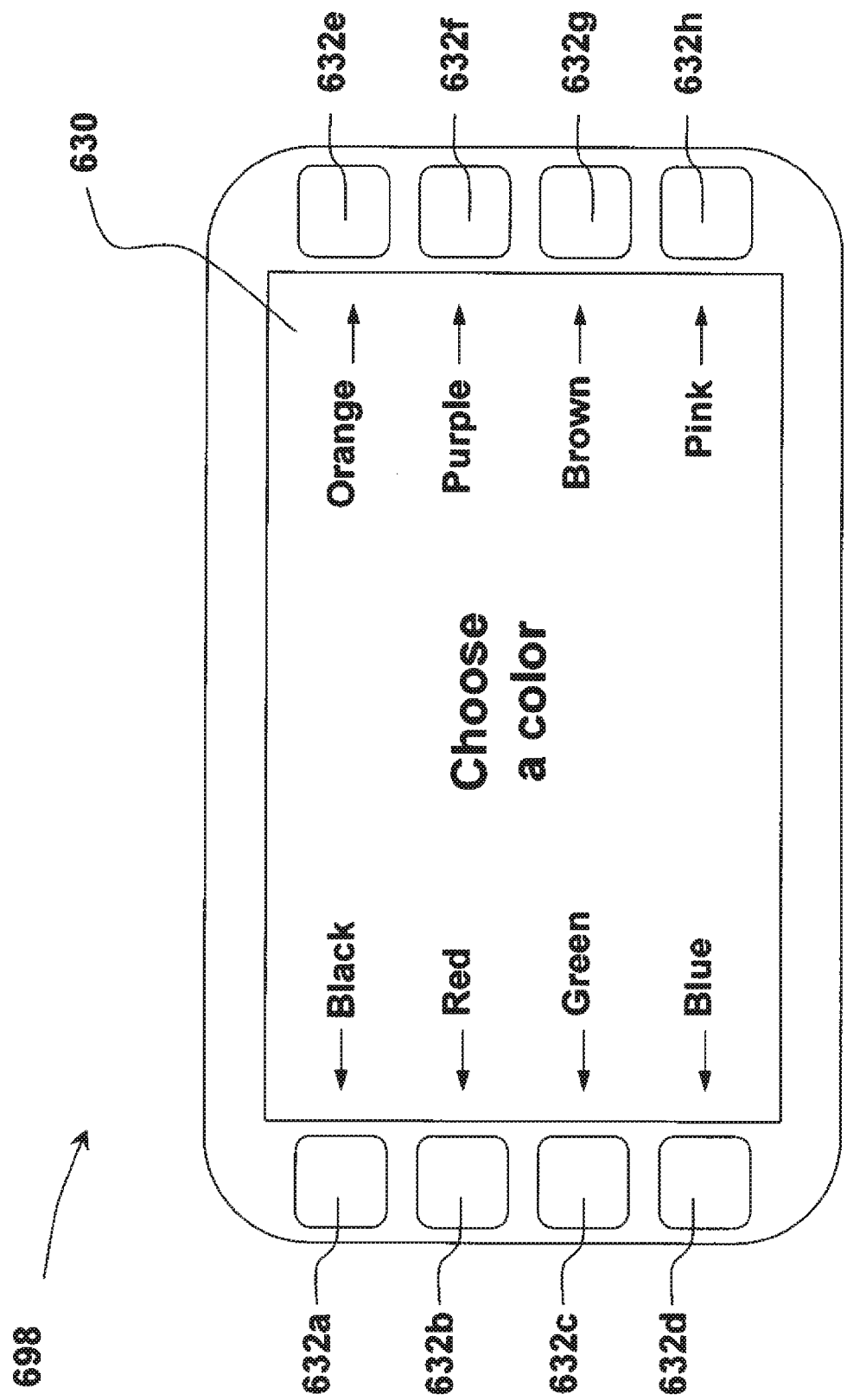
FIG. 13 is a plan view of a portion of still yet another embodiment of a tool tray forming part of the interactive input system of FIG. 1.

FIG. 13 shows an alternative display for the tool tray of the interactive input system 20 and which is generally indicated using reference numeral 698. Display 698 is generally similar to display 98 described above and with reference to FIGS. 6 to 8. In this embodiment however, display 698 is not configured to receive touch input. Rather, display 698 has associated with it a plurality of eight (8) physical buttons 632*a* to 632*h* positioned along opposite sides of its display surface. Display 698, similar to display 98, is configured to display a pointer input attribute selection screen when a tool is removed from its receptacle. Each of the buttons 632*a* to 632*h* may be pressed to assign an associated attribute to subsequent pointer input made on the interactive surface 24. In the embodiment shown in FIG. 13, the pointer input attribute selection screen is a pointer colour selection screen 630. Pointer colour selection screen 630 comprises a plurality of pointer colours and associated arrows that point to each of the buttons 632*a* to 632*h*. Here, buttons 632*a*, 632*b*, 632*c*, 632*d*, 632*e*, 632*f*, 632*g* and 632*h* are associated with black, red, green, blue, orange, purple, brown and pink colours, respectively. Selection of any of the buttons 632*a* to 632*h* automatically assigns a pointer mode to subsequent pointer input made on the interactive surface 24. For example, pressing attribute button 632*b* assigns the pointer mode to subsequent pointer input and sets the pointer colour to red. In this embodiment, when a button 632*a* to 632*h* is pressed, the pressed button blinks to provide a visual indication that the colour is active. When the button associated with the active colour is pressed again, the active status indication is cancelled and the pointer input mode reverts to a default pointer input mode. In this embodiment, the default pointer input mode is the pointer mode.

Although in embodiments described above, the tool tray comprises selectable virtual or physical buttons, in other embodiments, the tool tray may comprise a combination of virtual and physical buttons and/or other selectable features such as dials to enable a user to provide input to the tool tray.

Although in embodiments described above, the display is described as comprising a colour LCD panel and a resistive touch layer thereon, in other embodiments, the display may alternatively be a black and white or a grayscale LCD display panel. Also, alternative types of display panels may be employed such as for example light emitting diode (LED) display panels, organic light emitting diode (OLED) display panels, organic light emitting transistor (OLET) display panels, surface-conduction electron-emitter display (SED) panels, electroluminescent display (ELD) panels or plasma display panels (PDPs). Also, alternative touch technology may be used with the display such as for example capacitive, projected capacitive, electromagnetic induction, acoustic or camera-based touch technology.

Although in embodiments described above, the display is described as displaying a login screen, scheduling screen, a pointer screen, and an eraser attribute screen, in other embodiments, other screens may alternatively be displayed. For example, the display may alternatively display information related to inserting digital objects, such as for example images, 3D objects, and media files, or formatting toolbars, such as for example those found in Microsoft® Office products. Alternatively, the display may display screens enabling the display to serve as an extended desktop environment for the interactive surface 24.

In other embodiments, the tool tray may comprise circuitry for switching between video sources that is controlled by a virtual or physical button which when selected, causes the display to present a list of available video inputs to the projector. For example, these available video inputs may include "VGA", "HDMI", "composite video", "component video", and so forth, depending on the type of video input. If the projector has more than one of a particular kind of video input, these could be referred to as "VGA1", "VGA2", for example. Alternatively, the display may display a list of particular types of devices likely to be connected to the various video ports. For example, one of the video ports input may be designated as "Meeting Room PC", while another of the ports may be designated as "Guest Laptop", etc. Selecting a particular video input from the list of available video inputs displayed causes a video switching accessory (not shown) installed in the tool tray to change to that video input. Here, the video switching accessory would have input ports (not shown) corresponding to various formats of video input, such as VGA, HDMI, composite video, component video, and the like, for allowing the connection of laptops, DVD players, VCRs, Bluray players, gaming machines such as Sony Playstation 3, Microsoft Xbox 360 or Nintendo Wii, and/or other video/media devices to the interactive input system 20.

Although in embodiments described above, the tool tray is centrally located relative to the interactive surface 24, in other embodiments, the tool tray may alternatively be located at another location relative to the interactive surface 24, such as towards an edge or on the side of the interactive surface.

Although in embodiments described above, the interactive input system 20 has one tool tray, in other embodiments, the interactive input system may employ two or more tool trays positioned either on the same or on different sides of the interactive board.

Although in embodiments described above, the tool tray is described as having specific numbers of displays and/or single-line displays, those of skill in the art will appreciate that the specified numbers of displays and single-line displays are for illustrative purposes only and that alternative numbers of displays and/or single-line displays may be employed.

Although in embodiments described above, the interactive input system employs machine vision to detect one or more pointers in proximity with the interactive surface, in other embodiments, the interactive input system may instead employ an interactive board that makes use of other technology to detect pointer interaction with the interactive surface. For example, the interactive input system may employ an interactive board utilizing any of analog resistive, surface acoustic wave, electromagnetic induction, capacitive, and projected capacitive technologies, or other suitable technologies known in the art to detect pointer input.

In the embodiments described above, a short-throw projector is used to project an image onto the interactive surface 24. As will be appreciated other front projection devices or alternatively a rear projection device may be used to project the image onto the interactive surface 24. Rather than being supported on a wall surface, the interactive board 22 may be supported on an upstanding frame or other suitable support. Still alternatively, the interactive board 22 may engage a display device such as for example a plasma television, a liquid crystal display (LCD) device etc. that presents the image data output of the general purpose computing device 28.

Although in embodiments described above, the tool tray comprises one or more receptacles for supporting pen or eraser tools, in other embodiments, the tool tray may alternatively not comprise any tool supporting receptacle. In these alternative embodiments, any pointer attribute selected by touch input with the display, or by using physical buttons adjacent the display, is assigned to all subsequent pointer input made on the interactive surface 24.

Although a specific processing configuration has been described, those of skill in the art will appreciate that alternative processing configurations may be employed. For example, one of the imaging assemblies may take on the master controller role. Alternatively, the general purpose computing device may take on the master controller role.

Although in embodiments described above, pointer attributes are selectable by pressing virtual attribute buttons displayed on the display or by pressing physical buttons on the display, in other embodiments, pointer attributes may alternatively be selectable from a software toolbar displayed on the interactive surface 24. Here, the tool tray may comprise a physical or virtual button which, when pressed, directs the general purpose computing device 28 to display such a toolbar. In a related embodiment, when the interactive input system 20 is operating in the split-screen mode, each screen portion of the interactive surface 24 may have a respective software toolbar displayed thereon. When an attribute is selected from such a toolbar, the selected attribute can be applied to all pointer input made on the interactive surface within the respective screen portion of the interactive surface, and may also be used to override any attribute information previously selected using the display. Here, the selection of an attribute from the software toolbar cancels any status indication provided by the display. If a common attribute (e.g. blue pointer colour) is selected using the respective software toolbar of both screen portions, the blue status indicator on the display is activated.

Although in embodiments described above, the interactive board operates in the split-screen mode in which selection of an attribute button from a single set of attribute buttons displayed on the display assigns that attribute to pointer input on both screen portions, in other embodiments, two sets of attribute buttons may alternatively be displayed on the display for assignment of a respective attribute to pointer input made on each screen portion of the interactive surface 24.

Although in embodiments described above, the tool tray comprises control buttons provided on the upper surface of the housing to enable additional functions to be executed using the interactive input system, where the additional functions include launching an on-screen keyboard and initiating a calibration routine, in other embodiments, the additional functions may alternatively comprise other functions.

Although in embodiments described above, each virtual button blinks to indicate that the attribute associated with the virtual button is active, in other embodiments, the virtual button may instead remain in an illuminated state.

Although in embodiments described above, the default pointer input mode is a pointer mode where pointer input is treated as mouse events, in other embodiments, the default pointer input mode may alternatively be the pointer mode having a black pointer colour.

Although embodiments have been described, those of skill in the art will appreciate that other variations and modifications may be made without departing from the spirit and scope thereof as defined by the appended claims.

What is claimed is:

1. A tool tray for an interactive input system comprising:
a housing configured to be mounted adjacent a bottom edge of an upright touch-enabled interactive surface and having an upper surface defining at least one receptacle sized to receive a tool for interacting with the interactive surface;
a sensor configured to detect the presence of the tool within the receptacle; and
at least one display panel mounted on said housing and being responsive to the sensor, the display panel comprising a touch-enabled display surface configured to present a pointer attribute selection screen upon removal of the tool from the receptacle.

2. The tool tray according to claim 1, wherein the pointer attribute selection screen is a pointer colour selection, size selection and/or shape selection screen.

3. The tool tray according to claim 1, wherein the pointer attribute selection screen comprises at least one virtual button associated with an attribute of pointer input.

4. The tool tray according to claim 3, wherein the pointer attribute selection screen is a pointer colour selection, size selection and/or shape selection screen.

5. The tool tray according to claim 4, wherein the pointer colour selection screen comprises a plurality of virtual buttons each associated with a pointer colour.

6. The tool tray according to claim 5, wherein selection of one of the virtual buttons assigns a pointer colour to subsequent pointer interaction with said interactive surface.

7. The tool tray according to claim 1, wherein the display panel is configured to display at least one additional screen.

8. The tool tray according to claim 7, wherein the at least one additional screen comprises a pointer attribute screen that comprises at least one virtual button selectable for assigning a pointer colour, size and/or shape attribute to subsequent pointer interaction with said interactive surface.

9. The tool tray according to claim 7, wherein the at least one additional screen comprises an eraser attribute screen that comprises at least one virtual button selectable for assigning an eraser attribute to subsequent pointer interaction with said interactive surface.

10. The tool tray according to claim 7, wherein the at least one additional screen comprises an insert object screen that comprises at least one virtual button selectable for assigning an object insertion attribute to subsequent pointer interaction with said interactive surface.

11. The tool tray according to claim 1, comprising a plurality of spaced apart display panels mounted on said housing.

12. The tool tray according to claim 11, wherein at least one display panel of said plurality is associated with a respective receptacle.

13. The tool tray according to claim 12, wherein said at least one display panel is configured to display a pointer colour selection, size selection and/or shape selection screen for pointer input from a pen tool associated with the respective receptacle.

14. The tool tray according to claim 12, wherein said at least one display panel is configured to display a single line of text.

15. The tool tray according to claim 14, wherein said at least one display panel is configured to display an attribute associated with pointer input from a pen tool associated with the respective receptacle.

16. The tool tray according to claim 14, wherein said at least one display panel is configured to enable a user to scroll through available pointer modes.

17. The tool tray according to claim 14, wherein said at least one display panel is configured to display an active pointer colour.

18. The tool tray according to claim 1, further comprising: a plurality of physical buttons on said housing that are associated with the display panel.

19. The tool tray according to claim 18, wherein each of the physical buttons is associated with a pointer input attribute.

20. The tool tray according to claim 19, wherein the pointer input attribute is a pointer input colour.

21. The tool tray according to claim 1, wherein the display panel is one of a liquid crystal display panel, a light emitting diode display panel, an organic light emitting diode display panel, an organic light emitting transistor display panel, a surface-conduction electron-emitter display panel, an electroluminescent display panel, and a plasma display panel.

22. The tool tray according to claim 1, wherein the display panel utilizes one of analog resistive, capacitive, projected capacitive, electromagnetic induction, acoustic and camera-based touch technology to detect touch input.

23. The tool tray according to claim 1 wherein the upper surface of said housing defines a plurality of receptacles sized to receive tools for interacting with said interactive surface.

24. The tool tray according to claim 23 wherein at least one of said receptacles is configured to receive a pen tool.

25. The tool tray according to claim 24 wherein at least one of said receptacles is configured to receive an eraser tool.

26. The tool tray according to claim 24 wherein the display panel is postioned between receptacles.

27. The tool tray according to claim 26 wherein said display panel is generally centrally positioned along said housing.

28. The tool tray according to claim 24 comprising a plurality of display panels spaced apart along said housing.

29. The tool tray according to claim 28 wherein said displays display panels are positioned adjacent opposite ends of said housing.

30. The tool tray according to claim 28 wherein each display panel is positioned on said housing adjacent a respective receptacle.

31. An interactive input system comprising:
an interactive surface defining a primary display surface of said interactive input system on which an image is presented; and
a tool tray adjacent the interactive surface comprising:
a housing configured to accommodate at least one tool for interacting with the interactive surface;
a sensor configured to detect the presence of the tool when accommodated by the housing; and
at least one display on the housing, the display having a touch-enabled surface configured to present a control screen for said interactive input system, said control screen comprising at least one selectable attribute and being presented on said touch-enabled surface upon removal of the tool from the housing.

32. The interactive input system according to claim 31, wherein the at least one selectable attribute comprises at least one of pointer colour, pointer size and pointer shape.

33. The interactive input system according to claim 31, wherein the control screen comprises at least one virtual button that is selectable to assign a pointer attribute to pointer input made on the interactive surface.

34. The interactive input system according to claim 33 wherein the pointer attribute comprises at least one of pointer colour, pointer size and pointer shape.

35. The interactive input system according to claim 31 wherein the control screen comprises at least one button that is selectable to assign a pointer attribute to pointer input made on the interactive surface.

36. The interactive input system according to claim 35 wherein the pointer attribute comprises at least one of pointer colour, pointer size and pointer shape.

37. The interactive input system according to claim 31, comprising a plurality of displays.

38. An interactive input system comprising:
a touch-enabled interactive surface on which an image is presented, said interactive surface being a primary display surface of said interactive input system; and
at least one display panel adjacent said interactive surface, said at least one display panel comprising a touch-enabled surface on which a control screen for said interactive input system is presented, said interactive surface and the touch-enabled surface of said display panel being individually responsive to input touch events; wherein the image presented on said interactive surface is a computer desktop and wherein the control screen presented on the touch-enabled surface of said display panel comprises at least one selectable attribute; said interactive input system further comprising a tool tray mounted on said interactive surface, said tool tray supporting said display panel and accommodating tools for interacting with the interactive surface; wherein default selectable attributes are presented on said control screen upon removal of a tool from said tool tray.

39. The interactive input system according to claim 38, wherein the at least one selectable attribute comprises at least one of pointer colour, pointer size and pointer shape.

40. The interactive input system according to claim 38, wherein the control screen comprises at least one virtual button that is selectable to assign a pointer attribute to pointer input made on the interactive surface.

41. The interactive input system according to claim 38, wherein the default selectable attributes comprise pointer colours.

\* \* \* \* \*